(12) United States Patent
Xiang et al.

(10) Patent No.: US 12,539,881 B2
(45) Date of Patent: Feb. 3, 2026

(54) AUTOMATIC DRIVING DEVICE AND VEHICLE CONTROL METHOD

(71) Applicant: DENSO CORPORATION, Kariya (JP)

(72) Inventors: Jingyu Xiang, Nisshin (JP); Hiroyuki Ohsawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 474 days.

(21) Appl. No.: 18/061,138

(22) Filed: Dec. 2, 2022

(65) Prior Publication Data

US 2023/0115708 A1  Apr. 13, 2023

Related U.S. Application Data

(63) Continuation of application No. PCT/JP2021/025514, filed on Jul. 6, 2021.

(30) Foreign Application Priority Data

Jul. 8, 2020 (JP) .................................. 2020-117903

(51) Int. Cl.
*B60W 60/00* (2020.01)
*B60W 30/18* (2012.01)
*B60W 50/08* (2020.01)
*B60W 50/14* (2020.01)
*G01C 21/00* (2006.01)

(52) U.S. Cl.
CPC .......... *B60W 60/001* (2020.02); *B60W 30/18* (2013.01); *B60W 50/085* (2013.01); *B60W 50/14* (2013.01); *G01C 21/3889* (2020.08); *G01C 21/3896* (2020.08); *B60W 2556/05* (2020.02)

(58) Field of Classification Search
CPC .. B60W 60/001; B60W 30/18; B60W 50/085; B60W 50/14; B60W 2556/05; G01C 21/3889; G01C 21/3896
See application file for complete search history.

(56) References Cited

U.S. PATENT DOCUMENTS

| 2016/0275792 A1 | 9/2016 | Takiguchi et al. |
| 2018/0292832 A1* | 10/2018 | Bae ........................ B60W 30/06 |
| 2019/0012537 A1* | 1/2019 | Heimberger .............. G06T 7/60 |
| 2019/0064843 A1 | 2/2019 | Matsui et al. |
| 2019/0187723 A1 | 6/2019 | Tao et al. |
| 2019/0294897 A1 | 9/2019 | Cohen et al. |

(Continued)

FOREIGN PATENT DOCUMENTS

| JP | H10-141969 A | 5/1998 |
| JP | 2015-41283 A | 3/2015 |

(Continued)

OTHER PUBLICATIONS

Aisin, Japanese Patent Publication No. JP 2019053394A "Machine Translation" (Year: 2019).*

*Primary Examiner* — Hussein Elchanti
(74) *Attorney, Agent, or Firm* — Maschoff Brennan

(57) ABSTRACT

An automatic driving device generates a control plan for autonomously driving a vehicle using map data. The automatic driving device determines an acquisition status of the map data. The automatic driving device generates the control plan using the map data. The automatic driving device changes the control plan according to the acquisition status of the map data.

21 Claims, 11 Drawing Sheets

(56) References Cited

U.S. PATENT DOCUMENTS

| | | |
|---|---|---|
| 2019/0295179 A1 | 9/2019 | Shalev-Shwartz et al. |
| 2019/0299983 A1 | 10/2019 | Shalev-Shwartz et al. |
| 2020/0073404 A1 | 3/2020 | Shi et al. |
| 2020/0218280 A1 | 7/2020 | Matsui et al. |
| 2020/0370915 A1 | 11/2020 | Yoshida |
| 2021/0180979 A1 | 6/2021 | Kitahara |
| 2022/0111523 A1* | 4/2022 | Lee ............... G05D 1/0274 |
| 2022/0121218 A1 | 4/2022 | Matsui et al. |
| 2022/0155081 A1* | 5/2022 | Ahn ............. B60W 60/0011 |
| 2023/0115708 A1* | 4/2023 | Xiang ........... B60W 60/0053 701/23 |
| 2023/0280183 A1* | 9/2023 | Hayat ............ G01C 21/3889 701/423 |

FOREIGN PATENT DOCUMENTS

| | | |
|---|---|---|
| JP | 2019-053394 A | 9/2019 |
| JP | 2019-174829 A | 10/2019 |
| JP | 2020-045039 A | 3/2020 |
| WO | 2019/167257 A1 | 9/2019 |

\* cited by examiner

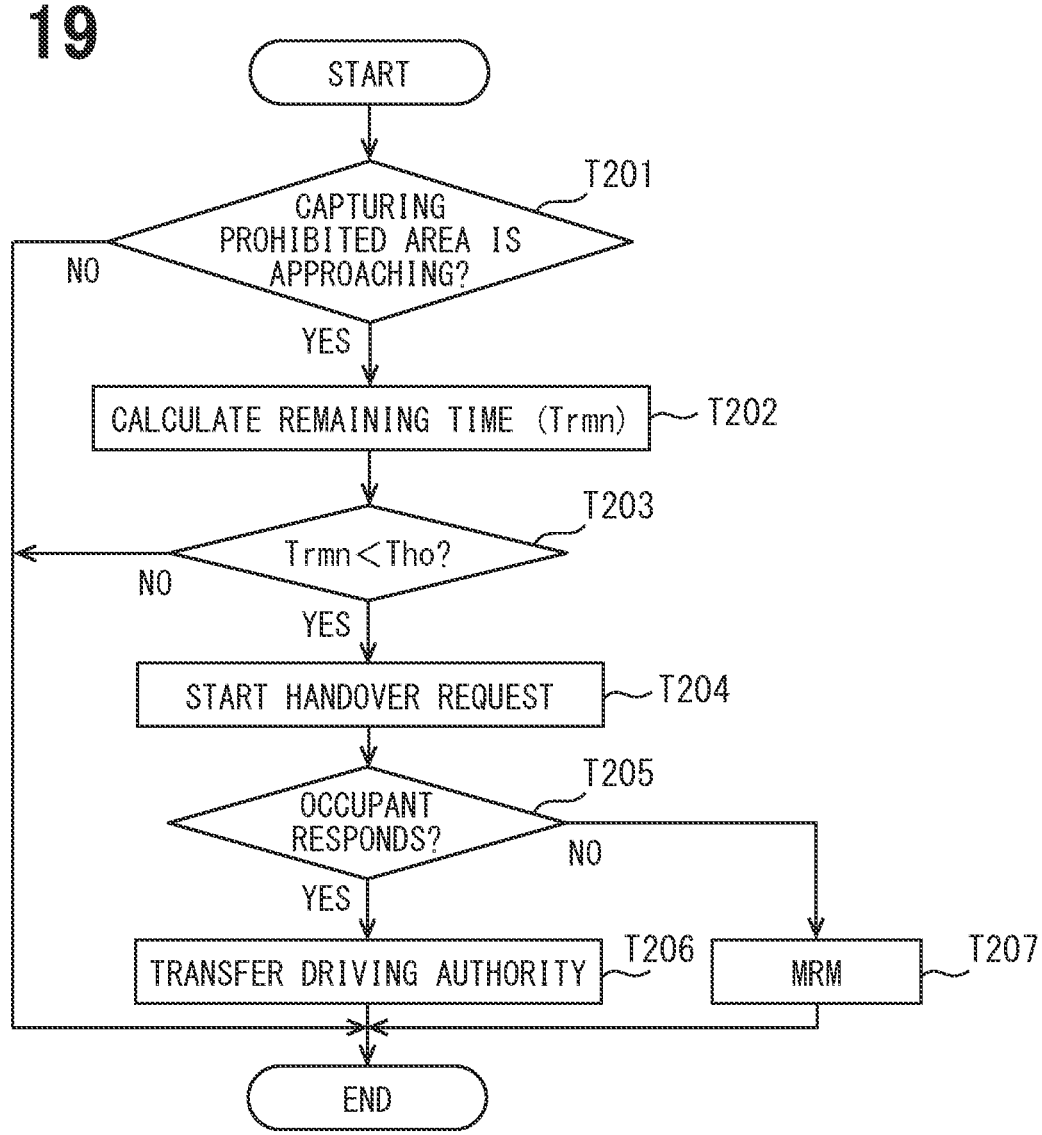

AUTOMATIC DRIVING DEVICE AND VEHICLE CONTROL METHOD

CROSS REFERENCE TO RELATED APPLICATIONS

The present application is a continuation application of International Patent Application No. PCT/JP2021/025514 filed on Jul. 6, 2021, which designated the U.S. and claims the benefit of priority from Japanese Patent Application No. 2020-117903 filed on Jul. 8, 2020. The entire disclosures of all of the above applications are incorporated herein by reference.

TECHNICAL FIELD

The present disclosure relates to an automatic driving device that generates a control plan for an automatic driving vehicle using map data.

BACKGROUND

An automatic driving device that generates, in automatic driving, a travel plan, in other words, a control plan of a vehicle using a mathematical formula model called a Responsibility Sensitive Safety (RSS) model and map data has been proposed.

A planner, which is a functional block for formulating the control plan in the RSS model, calculates a potential accident liability value for each of a plurality of control plans using the map data, and adopts the control plan in which the potential accident liability value falls within an allowable range. The potential accident liability value is a parameter that indicates the degree of responsibility of the subject vehicle when an accident occurs between the subject vehicle and a surrounding vehicle existing around the subject vehicle. The potential accident liability value is a value that takes into account whether or not inter-vehicle distance between the subject vehicle and the surrounding vehicle is shorter than a safe distance determined based on road structure or the like.

SUMMARY

The present disclosure provides an automatic driving device generates a control plan for autonomously driving a vehicle using map data. The automatic driving device determines an acquisition status of the map data. The automatic driving device generates the control plan using the map data. The automatic driving device changes the control plan according to the acquisition status of the map data.

BRIEF DESCRIPTION OF DRAWINGS

The features and advantages of the present disclosure will become more apparent from the following detailed description made with reference to the accompanying drawings. In the drawings:

FIG. 19 is a diagram showing an example of a processing flow for executing a handover request based on approaching a capturing prohibited area or distribution prohibited area.

DETAILED DESCRIPTION

Figure 1:
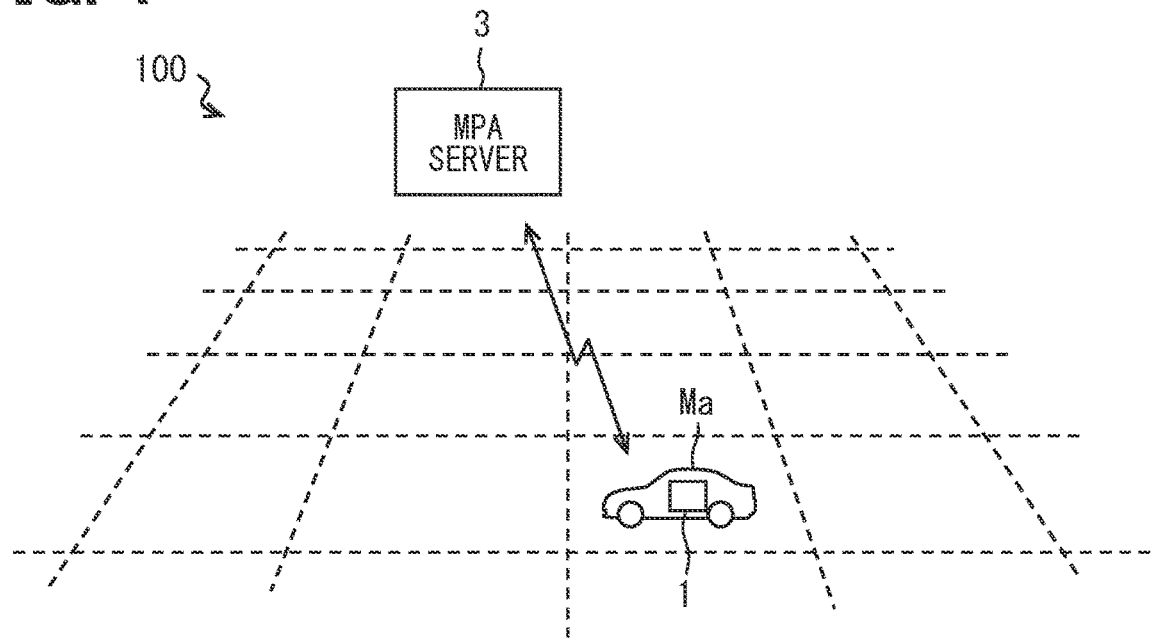
FIG. 1 is a diagram schematically showing an overall configuration of an automatic driving system.

For example, the RSS model assumes that the vehicle holds the map data. When the vehicle holds the latest map data for all areas, it is less likely that the potential accident liability value cannot be calculated due to map deficiencies such as missing or deteriorated map data. However, it is difficult from the viewpoint of data capacity and communication frequency for the vehicle to keep map data of all areas in the latest state at all times.

Due to such concern, it is assumed that the vehicle downloads and uses a partial map, which is a map of a local area corresponding to the current position, from a map server each time. However, in a configuration in which a partial map is downloaded and used, a situation may occur in which the partial map data of the area required for calculating the potential accident liability value cannot be acquired due to a communication error, download error, system processing error, or the like.

In addition, there may be a case where the map data distributed by the map server is not consistent with the real world due to environmental changes in the real world. When the map data cannot be acquired, or when the map data is not consistent with the real world, the planner will not be able to calculate a legitimate potential accident liability value. When the potential accident liability value cannot be calculated, the planner using the RSS model cannot quantitatively evaluate the safety of each control plan, so there is a possibility that automatic driving cannot be continued.

On the other hand, it is assumed that a normal user does not grasp map acquisition status for automatic driving in the vehicle. Therefore, interruption of automatic driving based on incomplete map data may be unintended for the user, in other words, unexpected behavior. As a result, the user may be confused.

The present disclosure provides an automatic driving device and a vehicle control method that can reduce possibility of confusing the user.

An exemplary embodiment of the present disclosure provides an automatic driving device generates a control plan for autonomously driving a vehicle using map data. The automatic driving device includes a map management unit and a control planning unit. The map management unit is configured to determine an acquisition status of the map data. The control planning unit is configured to generate the control plan using the map data. The control planning unit changes the control plan according to the acquisition status of the map data determined by the map management unit.

In the exemplary embodiment of the present disclosure, the control plan, in other words, the behavior of the vehicle changes according to the map acquisition status. Therefore, based on whether the behavior of the vehicle is the same as the behavior during normal operation, the user can perceive a sign that the automatic driving will be interrupted. As a result, the configuration can reduce the possibility of confusing the user.

Another exemplary embodiment of the present disclosure provides a vehicle control method for autonomously driving a vehicle using map data. The vehicle control method is executed by at least one processor. The vehicle control method includes: determining an acquisition status of the map data; and generating a control plan for the vehicle using the map data. The generating of the control plan includes changing a content of the control plan according to the acquisition status of the map data.

In another exemplary embodiment of the present disclosure, it is possible to reduce the possibility of confusing the user by the same effect as disclosed in the automatic driving device.

An embodiment of an automatic driving device according to the present disclosure will be described with reference to the drawings. In the following, an example of an area where left-hand traffic is legally enacted will be explained. In an area where right-hand traffic is enacted, the following description can be implemented with appropriate changes, such as reversing left and right. The contents of the present disclosure can be appropriately changed and implemented so as to comply with local laws and customs in which an automatic driving system 100 is used.

Embodiments of the present disclosure will be described below with reference to the drawings. FIG. 1 is a diagram showing an example of a schematic configuration of the automatic driving system 100 according to the present disclosure. As shown in FIG. 1, the automatic driving system 100 includes an in-vehicle system 1 built in a vehicle Ma and a map server 3. The in-vehicle system 1 performs wireless communication with the map server 3 to download partial map data which is local high-definition map data from the map server 3, and uses the data for automatic driving and navigation.

The in-vehicle system 1 may be mounted on a vehicle capable of traveling on roads, and the vehicle Ma may be a four-wheeled vehicle, a two-wheeled vehicle, a three-wheeled vehicle. Motorized bicycles may also be included in two-wheeled vehicles. The vehicle Ma may be an owner car owned by an individual, a shared car, or a service car. The service car includes a taxi, a fixed-route bus, a shared bus, and the like. The vehicle Ma may be a robot taxi, an unmanned bus, or the like without a driver on board. The vehicle Ma may be configured to be remotely operable by an external operator when the vehicle Ma falls into a situation in which automatic driving is difficult. The operator here refers to a person who has the authority to remotely control the vehicle from the outside of the vehicle, such as a predetermined center. The operator can also be included in a driver or an occupant in the driver seat. It should be noted that the operator may be a server or software capable of determining the driving operation according to the scene based on artificial intelligence.

(Map Data)

First, the map data stored by the map server 3 will be described. The map data here corresponds to map data indicating a road structure, a position coordinate of a feature disposed along the road, and the like with the accuracy that enables use for automatic driving.

The map data includes node data, link data, feature data, and the like. The node data includes a various pieces of data such as a node ID in which a unique number is assigned to each node on a map, node coordinates, a node name, a node type, a connection link ID in which a link ID of a link connected to the node is described, and the like.

The link data is data about a link which is a road section connecting nodes. The link data includes various pieces of data such as an link ID that is a unique identifier for each link, a link length indicating a length of the link, a link azimuth, a link travel time, link shape information (hereinafter, link shape), node coordinates of a start point and an end point of the link, and road attributes. The link shape may be represented by a coordinate sequence indicating the coordinate position of shape interpolation point representing both ends of the link and the shape therebetween. The link shape corresponds to a road shape. The link shape may be represented by a cubic spline curve. The road attributes include a road name, a road type, a road width, lane number information indicating the number of lanes, a speed regulation value, and the like. The link data may be subdivided and described for each lane. The map data may include road link data corresponding to link data for each road grouping lanes having the same traveling direction, and lane ring data as a lower layer corresponding to link data for individual lanes. The link data may be subdivided by lane in addition to by the road section.

The feature data includes lane marking data and landmark data. The lane marking data includes a lane marking ID for each lane marking and a group of coordinate points representing an installation portion. The lane marking data includes pattern information such as broken lines, solid lines, and road tracks. The lane marking data is associated with lane information such as a lane ID and a lane-level link ID. The landmark is a feature that can be used as a mark for identifying the position of the subject vehicle on the map. The landmark includes a predetermined three-dimensional structure installed along roadside. The three-dimensional structure installed along the roadside may include guard rails, curbs, trees, electric poles, traffic signs, or traffic lights. The traffic signs include guide signs such as direction signs and road name signs. In addition, the traffic signs may also include road edges and lane markings. The landmark data represents the position and type of each landmark. The shape and position of each feature are represented by a group of coordinate points. POI data is data indicative of the position and the type of the feature which affects vehicle travel plans such as branch points for exiting a main lane of highway, junctions, speed limit change points, lane change points, traffic jams, construction sections, intersections, tunnels, toll gates, or the like. POI data includes type and location information.

The map data may include a three-dimensional map data including feature points of the road shape and the building. The three-dimensional map data corresponds to map data representing the positions of features such as road edges, lane markings, and traffic signs in three-dimensional coordinates. The three-dimensional map may be generated by REM (Road Experience Management) based on captured images. In addition, the map data may include a traveling trajectory model. The travel trajectory model is track data generated by statistically integrating the travel trajectories of a plurality of vehicles. The travel trajectory model is, for example, an average of traveling trajectories for each lane. The traveling trajectory model corresponds to data indicating a traveling track that serves as a reference during automatic driving.

The map data may include static map information and semi-static map information. The static map information here refers to information about features that are difficult to change, such as road networks, road shapes, road surface markings, structures such as guardrails, buildings, and the like. The static map information can also be understood as information about features that are required to be updated, for example, within one week to one month. The static map information is also referred to as a base map. The semi-static map information is, for example, information that is required to be updated within one to several hours. Road construction information, traffic regulation information, traffic congestion information, and wide area weather information correspond to the semi-static map information. For example, map data handled by the map server 3 includes the static map information and the semi-static map information. Alternatively, the map information handled by the map server 3 may only include the static map information.

The map server 3 includes full map data corresponding to the entire map recording area. However, all map data is divided into a plurality of patches and managed. Each patch corresponds to map data for different areas. For example, as shown in FIG. 1, the map data is stored in units of map tiles in which the map recording area is divided into 2 km square rectangles. Note that the dashed lines in FIG. 1 conceptually indicate boundaries between map tiles. The map tiles correspond to a subordinate concept of the patch described above.

Each map tile is provided with information indicating the real-world region to which the map tile corresponds. Information indicating real-world areas is represented by, for example, latitude, longitude, and altitude. Each map tile is given a unique ID (hereinafter, tile ID). A map tile is associated with an adjacent tile ID, which is the tile ID of an adjacent area. The adjacent tile ID can be used, for example, to identify the next area map data. The map data for each patch or map tile is part of the entire map recording area, in other words, local map data. Map tiles correspond to partial map data. The map server 3 distributes partial map data corresponding to the position of the in-vehicle system 1 based on a request from the in-vehicle system 1.

The shape of the map tile is not limited to a 2 km square rectangle. The shape of the map tile may have a rectangular shape of 1 km square or 4 km square. Further, the map tile may be hexagonal or circular. Each map tile may be set to partially overlap with adjacent map tiles. The map recording area may be the entire country where the vehicle is used, or may be only a part of the area. For example, the map recording area may be limited to an area where automatic driving of a general vehicle is permitted or an area where an automatic driving operation service is provided.

Also, the sizes and shapes of the plurality of map tiles may not be uniform. For example, a map tile in a rural area where the density of map elements such as landmarks is likely to be relatively sparse may be larger than a map tile in an urban area where map elements such as landmarks are likely to be densely present. For example, the map tiles in the rural area may have a rectangular shape of 4 km square, while the map tiles in the urban area may have a rectangular shape of 1 km square or 0.5 km square. The urban area here refers to, for example, an area where the population density is equal to or larger than a predetermined value or an area where offices and commercial facilities are concentrated. The rural areas may be areas other than urban areas. Rural areas may be defined as countryside areas.

In addition, the division mode of all map data may be defined by the data size. In other words, the map recording area may be divided and managed within a range defined by the data size. In that case, each patch is set so that the amount of data is less than a predetermined value. According to such an aspect, the data size in one delivery can be set to a certain value or less.

(Schematic Configuration of Vehicle System 1)

Figure 2:
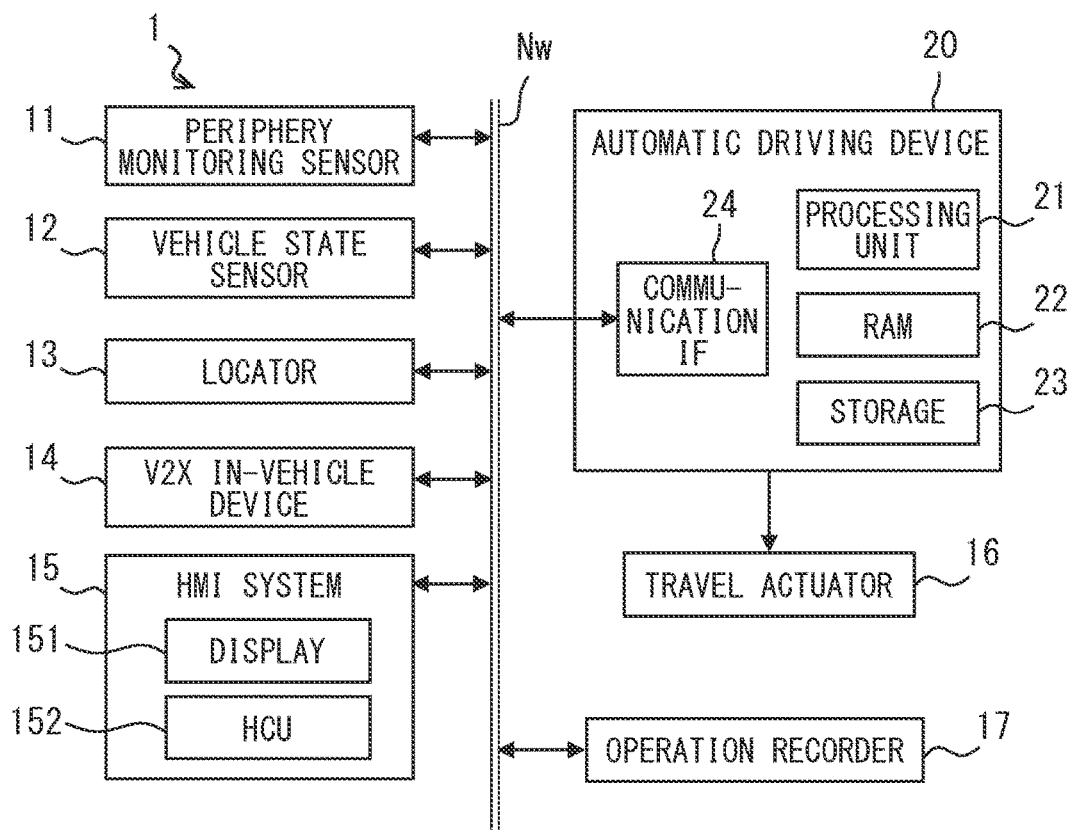
FIG. 2 is a diagram showing a configuration of an in-vehicle system.

Here, the configuration of the in-vehicle system 1 will be described with reference to FIG. 2. The vehicle system 1 shown in FIG. 2 is used for a vehicle configured to perform automatic driving (hereinafter referred to as an automatic driving vehicle). As shown in FIG. 2, the in-vehicle system 1 includes a periphery monitoring sensor 11, a vehicle state sensor 12, a locator 13, a V2X in-vehicle device 14, an HMI system 15, a travel actuator 16, an operation recording device 17, and an automatic driving device 20. The HMI is an abbreviation for human machine interface. The V2X is an abbreviation for vehicle to x (everything) and refers to a communication technology that connects various things to a vehicle.

Various devices or sensors forming the in-vehicle system 1 are connected as nodes to an in-vehicle network Nw serving as a communication network built inside the vehicle. The nodes connected to the in-vehicle network Nw can communicate with one another. Specific devices may be configured to be able to communicate directly with one another without communicating through the in-vehicle network Nw. For example, the autonomous driving device 20 and the operation recording device 17 may be directly electrically connected by a dedicated line. Although the in-vehicle network Nw is configured to be a bus type in FIG. 2, the configuration is not limited thereto. The network topology may be a mesh type, a star type, or a ring type. A network shape can be changed as appropriate. The in-vehicle network Nw may adopt various network standards, such as Controller Area Network (hereinafter referred to as CAN, registered trademark), Ethernet (registered trademark), FlexRay (registered trademark).

Hereinafter, a vehicle on which the in-vehicle system 1 is mounted is also described as a subject vehicle Ma, and an occupant seated in a driver's seat of the subject vehicle Ma (that is, occupant in the driver's seat) is also described as a user. In the following description, a front rear direction, a lateral direction, and an up down direction are defined with reference to the subject vehicle Ma. Specifically, the front rear direction corresponds to a longitudinal direction of the subject vehicle Ma. The lateral direction corresponds to a width direction of the subject vehicle Ma. The up down direction corresponds to a height direction of the subject vehicle Ma. From another point of view, the up down direction corresponds to a direction perpendicular to a plane parallel to the front rear direction and the lateral direction.

The subject vehicle Ma is configured to perform the automatic driving. The degree of automatic driving (hereinafter referred to as automation level) can have multiple levels, as defined by the Society of Automotive Engineers of America (SAE International), for example. According to the SAE definition, for example, the automation levels are categorized into the following six levels.

Level 0 is a level where the driver performs all driving tasks without any intervention of the system. Herein, driving tasks may include a steering operation, acceleration/deceleration operation, and the like. Level 0 corresponds to a fully manual driving level. Level 1 is a level in which the system assists either the steering operation or the acceleration/deceleration operation. Level 2 is a level in which the system supports multiple operations among the steering operation and the acceleration/deceleration operation. The level 1 and the level 2 each corresponds to a driving assistance level.

Level 3 is a level in which the system performs all of the driving operation within an operational design domain (ODD), while the operation authority is transferred from the system to the driver in an emergency situation. The ODD defines conditions under which autonomous driving can be executed, such as a traveling on a highway. In the level 3, the driver must be able to respond quickly when the system requests to take over the driving. In addition, instead of the occupant in the driver's seat, an operator existing outside of the vehicle may take over the driving operation instead of the system. The level 3 corresponds to a conditional automated driving. Level 4 is a level where the system is capable of performing all driving tasks, except under a specific circumstance, such as an unsupported road, an extreme environment, and the like. The Level 4 corresponds to a level in which the system performs all of the driving tasks within the ODD. The level 4 corresponds to a highly automated driving. Level 5 is a level at which the system is capable of performing all driving tasks in any situation. The level 5 corresponds to so-called fully automated driving. The levels 3-5 correspond to so-called automated driving. The level 3 to the level 5 can also be referred to as an automated driving that automatically execute all controls related to driving of vehicle.

The target level of the autonomous driving in the present disclosure may be set to level 3 or higher, or may be level 4 or higher. Hereinafter, an example where the subject vehicle Ma is driving at the level 3 or higher level will be described. Note that the automation level as the driving mode of the subject vehicle Ma may be switchable. For example, it may be possible to switch between an automatic driving mode of the automation level 3 or higher, a driving assistance mode of the level 1 or 2, and a manual driving mode of the level 0.

The periphery monitoring sensor 11 is a sensor that monitors a periphery environment of the subject vehicle. The periphery monitoring sensor 11 is configured to detect the presence and position of a predetermined detection target. The detection target may include, for example, a moving object, such as pedestrians or different vehicles. The different vehicle may include a bicycle, a motorized bicycle, or a motorcycle. In addition, the periphery monitoring sensor 11 is configured to be able to detect predetermined features and obstacles. The feature to be detected by the periphery monitoring sensor 11 may include a road edge, a road marking, and a three-dimensional structure installed along the roadside. The road marking is a marking that is painted on a road surface for traffic control and traffic regulation purpose. For example, the road surface marking includes a lane division line indicating a lane boundary, a pedestrian crossing, a stop line, a traffic lane, a safety zone, or a regulation arrow. The lane division line is also referred to as a lane mark or a lane marker. The lane division line also includes things realized by road studs such as chatter bars and botts' dots. The three-dimensional structure installed along the roadside may include guard rails, traffic signs, or traffic lights as described above. That is, it is preferable that the periphery monitoring sensor 11 is configured to be able to detect the landmarks. The obstacle here indicates a three-dimensional object that exists on the road and obstructs vehicle traffic. The obstacle include accident vehicles, debris from accident vehicles, and the like. For example, the obstacle can also include a regulation material and equipment for lane regulations such as an arrow board, a cone, and a guide board, a construction site, a parked vehicle, and an end of a traffic congestion. The periphery monitoring sensor 11 may be configured to be capable of detecting an object falling on the road, such as a tire that has fallen off the vehicle body.

As the periphery monitoring sensor 11, for example, a periphery monitoring camera, millimeter wave radar, LiDAR, sonar, and the like can be adopted. The LIDAR stands for Light Detection and Ranging/Laser Imaging Detection and Ranging. The millimeter wave radar is a device that detects a relative position or a relative speed of an object with respect to the subject vehicle Ma by transmitting millimeter waves or quasi-millimeter waves in a predetermined direction and analyzing reception data of reflected waves returned by the transmission waves reflected by the object. The millimeter wave radar generates, for example, data indicating the reception strength and the relative speed for each detection direction and distance or data indicating the relative position and reception strength of the detected object as the detection result. The LiDAR is a device that generates three-dimensional point cloud data indicating a position of a reflection point in each detection direction by emitting laser light.

The periphery monitoring camera is an in-vehicle camera arranged to capture an image in a predetermined direction outside the subject vehicle. The peripheral monitoring camera includes a front camera arranged at the upper end of the windshield inside the vehicle compartment, a front grill, and the like so as to photograph the front of the subject vehicle Ma. The front camera detects the above detection target using a discriminator using, for example, a Convolutional Neural Network (CNN) or a Deep Neural Network (DNN).

Object recognition processing based on observation data generated by the periphery monitoring sensor 11 may be executed by an Electronic Control Unit (ECU) outside the sensor, such as the automatic driving device 20. A part or all of the object recognition function provided by the periphery monitoring sensor 11, such as the front camera and the millimeter wave radar may be provided in the automatic driving device 20. In that case, the various periphery monitoring sensors 11 may provide observation data such as image data and ranging data to the automatic driving device 20 as detection result data.

The vehicle state sensor 12 is a sensor that detects the amount of state related to the traveling control of the subject vehicle Ma. The vehicle state sensor 12 includes a vehicle speed sensor, a steering sensor, an acceleration sensor, a yaw rate sensor, and the like. The vehicle speed sensor detects a speed of the subject vehicle. The steering sensor detects a steering angle of the subject vehicle. The acceleration sensor detects the acceleration in a front rear direction of the subject vehicle and the acceleration in a lateral direction of the subject vehicle. The acceleration sensor may also detect a deceleration of the subject vehicle, that is, a negative acceleration. The yaw rate sensor detects an angular velocity of the subject vehicle. The types of sensors used by the in-vehicle system 1 as the vehicle state sensor 12 may be appropriately designed, and it is not necessary to provide all of the above-described sensors.

The locator 13 is a device that generates highly accurate position information of the subject vehicle Ma through complex positioning for combining multiple information. The locator 13 is configured using, for example, a GNSS receiver. The GNSS receiver is a device that sequentially detects current positions of the GNSS receiver by receiving navigation signals transmitted from positioning satellites forming the Global Navigation Satellite System (GNSS). For example, when the GNSS receiver can receive the navigation signals from four or more positioning satellites, the GNSS receiver outputs positioning results every 100 milliseconds. As the GNSS, it is possible to adopt the GPS, the GLONASS, the Galileo, the IRNSS, the QZSS, or the Beidou.

The locator 13 sequentially measures the position of the subject vehicle Ma by combining a positioning result of the GNSS receiver and an output of the inertial sensor. For example, when the GNSS receiver cannot receive a GNSS signal inside a tunnel, the locator 13 performs dead reckoning (that is autonomous navigation) by using a yaw rate and a vehicle speed. The yaw rate used for the dead reckoning may be calculated by the front camera by using the SfM technique or may be detected by a yaw rate sensor. The locator 13 may perform dead reckoning by using the output of the acceleration sensor or the gyro sensor. The vehicle position is represented by three-dimensional coordinates of latitude, longitude, and altitude, for example. The vehicle position information obtained by positioning is output to the in-vehicle network Nw, and is used by the automatic driving device 20 and the like.

The locator 13 may be configured to be capable of perform a localization processing. The localization processing refers to processing of specifying a detailed position of the subject vehicle Ma by collating a coordinate of the landmark specified based on the image captured by the peripheral monitoring camera, such as the front camera 11a, and a coordinate of the landmark registered in the map data. The landmark may include a three-dimensional structure installed along the roadside, such as the traffic sign, the traffic light, the pole, or the commercial sign. Also, the locator 13 is configured to identify the lane ID, which is the identifier of the lane on which the subject vehicle Ma is traveling, based on the distance from the roadside detected by the front camera or the millimeter-wave radar. The traveling lane ID indicates which lane is the current traveling lane of subject vehicle from relative to the left or right end of the road. Some or all of the functions of the locator 13 may be provided in the automatic driving device 20. A lane in which the subject vehicle Ma is traveling can be referred to as an ego lane.

The V2X in-vehicle device 14 enables the subject vehicle Ma to perform a wireless communication with another device. The "V" of V2X refers to an automobile as the subject vehicle Ma, and the "X" refers to various objects other than the subject vehicle Ma, such as a pedestrian, a different vehicle, a road facility, a network, or a server. The V2X in-vehicle device 14 includes a wide area communication unit and a short range communication unit as communication modules. The wide area communication unit is a communication module for executing wireless communication compliant with a predetermined wide area wireless communication standard. As the wide area wireless communication standard here, various standards, such as long term evolution (LTE), 4G, or 5G, can be adopted. The wide area communication unit may be configured to execute wireless communication directly with other devices without going through a base station using a communication method compliant with the wide area wireless communication standard, in addition to a communication via a wireless base station. That is, the wide area communication unit may be configured to execute cellular V2X. The subject vehicle Ma may be a connected car that can be connected to the Internet by mounting the V2X in-vehicle device 14. For example, the automatic driving device 20 downloads the latest partial map data corresponding to the current position of the subject vehicle Ma from the map server 3 in cooperation with the V2X in-vehicle device 14. The V2X in-vehicle device 14 corresponds to a wireless communication device.

The short range communication unit provided in the V2X in-vehicle device 14 is a communication module for directly performing wireless communication with other moving objects or roadside devices existing around the subject vehicle Ma in accordance with a communication standard in which a communication distance is limited within several hundred meters, which is referred to as a short range communication standard. The other moving objects are not limited to the vehicles, and may include the pedestrian, the bicycle, or the like. As the short range communication standard, such as a wireless access in vehicular environment (WAVE) or a dedicated short range communications (DSRC) can be adopted. For example, the short range communication unit broadcasts vehicle information on the subject vehicle Ma to surrounding vehicles at a predetermined transmission cycle, and receives the vehicle information transmitted from other vehicles. The vehicle information includes a vehicle ID, a current position, a traveling direction, a travel speed, an operation state of a direction indicator, a time stamp, and the like.

The HMI system 15 is a system that provides an input interface function of receiving a user operation and an output interface function of presenting information to the user. The HMI system 15 includes a display 151 and an HMI Control Unit (HCU) 152. The HMI system 15 includes, as a device for presenting information to the user, a speaker, a vibrator, an illumination device (for example, an LED), or the like, in addition to the display 151.

The display 151 is configured to display images. The display 151 is, for example, a center display provided in the central region of the instrument panel in the vehicle width direction. The display 151 is capable of displaying full color images, and can be implemented by a liquid crystal display, an organic light emitting diode (OLED) display, a plasma display, or the like. The HMI system 15 may include a head-up display as the display 151, which projects a virtual image on a part of the front windshield in the front side of the driver's seat. The display 151 may be a meter display.

Figure 3A:
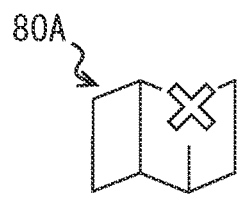
FIGS. 3A to 3C are diagrams each showing an example of an icon image indicating an acquisition status of map data.
Figure 3B:
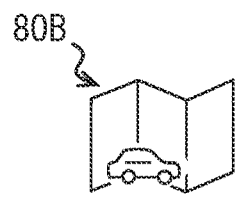
Figure 3C:
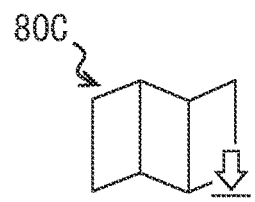

The 152 integrally controls information presentation to the user. The HCU 152 is implemented using a processor such as a Central Processing Unit (CPU) or a Graphics Processing Unit (GPU), a RAM, a flash memory, and the like. The HCU 152 controls a display screen of the display 151, based on a control signal input from the automatic driving device 20 and a signal input from an input device which is not illustrated. For example, the HCU 152 displays, on the display 151, a map icon 80 indicating the acquisition status of the partial map data in response to a request form the automatic driving device 20, as illustrated in FIGS. 3A to 3C. FIG. 3A shows an example of a map unacquired icon 80A indicating that the partial map data has not been downloaded. FIG. 3B shows an example of a map acquired icon 80B indicating that the partial map data has been successfully downloaded. FIG. 3C shows an example of a map acquiring icon 80C indicating that the partial map data is being downloaded. The map icon 80 can be displayed on, for example, the top corner of the display 151.

The travel actuator 16 refers to actuators used for traveling purpose. The travel actuator 16 includes, for example, a brake actuator as a braking device, an electronic throttle, a steering actuator, and the like. The steering actuators also include an Electric Power Steering (EPS) motors. The travel actuator 16 is controlled by the automatic driving device 20. A steering ECU that performs steering control, a power unit control ECU that performs acceleration/deceleration control, a brake ECU, or the like may be interposed between the automatic driving device 20 and the travel actuator.

The operation recording device 17 is a device that records data indicating at least either one of a status inside the vehicle and a status outside the vehicle when the vehicle travels. The status inside the vehicle when the vehicle travels can include the operation state of the automatic driving device 20 or the state of the occupant in the driver's seat. The data indicating the operation state of the automatic driving device 20 also includes a recognition result of the surrounding environment with respect to the automatic driving device 20, a traveling plan, a calculation result of the target control amount of each travel actuator, and the like. The data may include, as the recording target, an image obtained by capturing the display screen of the display 151, that is, a so-called screen shot. The data, which is the recording target, is acquired from the ECU or sensor mounted on the vehicle, such as the automatic driving device 20 or the periphery monitoring sensor 11, via the in-vehicle network Nw or the like. When a predetermined recording event occurs, the operation recording device 17 records various data for a predetermined period of time before and after the occurrence of the event. As recording events, for example, transfer of authority for driving operation, exit of ODD, execution of emergency action described later, change in automation level, execution of Minimum Risk Maneuver (MRM), and the like can be adopted. For example, when the automatic driving device 20 takes an emergency action, the operation recording device 17 stores data that can identify the partial map data acquired at that time. The data that can identify the acquired partial map data is, for example, a tile ID, version information, acquisition date and time, and the like. The data may be recorded in a non-volatile storage medium mounted on the subject vehicle Ma, or may be recorded in an external server.

The automatic driving device 20 is an Electronic Control Unit (ECU) that executes a part or all of the driving operations instead of the occupant in the driver's seat by controlling the travel actuator 16 based on the detection results of the periphery monitoring sensor 11 and the like. Here, as an example, the autonomous driving device 20 is configured to be able to execute up to the automation level 5, and is configured to be able to switch the operation mode corresponding to each automation level. Hereinafter, for convenience, the operation mode corresponding to the autonomous driving level N (N=0 to 5) will be referred to as a level N mode. For example, level 3 mode refers to an operation mode in which control equivalent to level 3 of automatic driving is performed.

Hereinafter, the explanation will be continued assuming that the system is operating in a mode of automation level 3 or higher. In the mode of automation level 3 or higher, the automatic driving device 20 automatically executes steering, acceleration, and deceleration (in other words, braking) of the vehicle such that the subject vehicle Ma travels along the road to a destination set by the occupant in the driver's seat or an operator. The switching of the operation mode is automatically executed due to a system limit, an exit from the ODD, and the like, in addition to the user operation.

The automatic driving device 20 mainly includes a computer including a processing unit 21, a RAM 22, a storage 23, a communication interface 24, a bus connecting these, and the like. The processing unit 21 is provided by hardware circuit and executes a calculation process in corporation with the RAM 22. The processing unit 21 includes at least one arithmetic core, such as a CPU. The processing unit 21 executes various processing of realizing a function of each functional unit, which will be described later, by accessing the RAM 22. The storage 23 includes a non-volatile storage medium, such as a flash memory. The storage 23 stores an automatic driving program, which is a program to be executed by the processing unit 21. Executing the automatic driving program by the processing unit 21 corresponds to, as a vehicle control method, executing a method corresponding to the autonomous driving program. The communication interface 24 communicates with other devices via the in-vehicle network Nw. The communication interface 24 may be implemented by an analog circuit element, an IC, or the like. The details of the automatic driving device 20 will be described later.

(Configuration of Automatic Driving Device 20)

Figure 4:
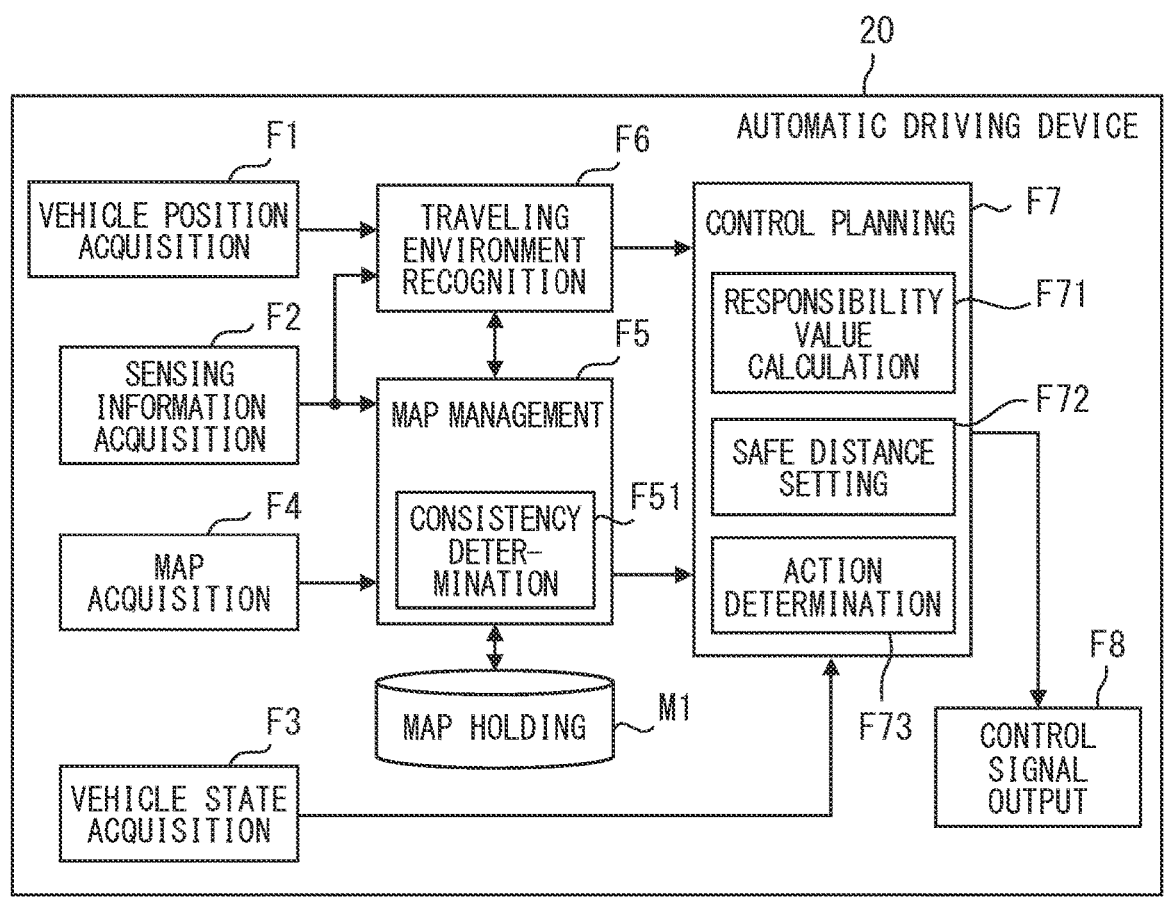
FIG. 4 is a diagram showing a configuration of an automatic driving device 20.

Here, the function and the operation of the automatic driving device 20 will be described with reference to FIG. 4. The automatic driving device 20 provides functions corresponding to various functional blocks shown in FIG. 4 by executing the automatic driving program stored in the storage 23. In other words, the automatic driving device 20 includes, as functional blocks, a vehicle position acquisition unit F1, a sensing information acquisition unit F2, a vehicle state acquisition unit F3, a map acquisition unit F4, a map management unit F5, a traveling environment recognition unit F6, a control planning unit F7, and a control signal output unit F8. The map management unit F5 has a consistency determination unit F51 as a sub-function, the control planning unit F7 has a responsibility value calculation unit F71, a safe distance setting unit F72, and an action determination unit F73 as sub-functions. The automatic driving device 20 also includes a map holding unit M1.

The subject vehicle position acquisition unit F1 acquires the current position coordinates of the subject vehicle Ma from the locator 13. The vehicle position acquisition unit F1 is configured to read the latest subject vehicle position information stored in the non-volatile memory as the current position information immediately after the power source for traveling the vehicle is turned on. This is because the latest position calculation result stored in the memory corresponds to an end point of the previous trip, that is, a parking position. The trip here refers to the traveling from when the traveling power supply is turned on to when the traveling power supply is turned off. In order to execute the above processing, the automatic driving device 20 is preferably configured to store the vehicle position information observed at the time of parking in a non-volatile memory as shutdown processing after parking. The traveling power source here is a power source for the vehicle to travel, and refers to an ignition power source when the vehicle is a gasoline vehicle. When the vehicle is an electric vehicle or a hybrid vehicle, the system main relay corresponds to the traveling power source.

The sensing information acquisition unit F2 acquires the detection result (that is, sensing information) of the periphery monitoring sensor 11. The sensing information includes the positions and moving speeds of other moving bodies, features, obstacles, and the like existing around the subject vehicle Ma. For example, the sensing information includes the distance between the subject vehicle Ma and a forward vehicle, which is a vehicle traveling in front of the subject vehicle Ma, and the moving speed of the front vehicle. The forward vehicle here includes a so-called preceding vehicle that travels in the same lane as the subject vehicle, as well as a vehicle that travels in an adjacent lane. That is, the forward direction here is not limited to the direction directly in front of the subject vehicle Ma, but can include the diagonally forward direction. The sensing information also includes the lateral distance to the edge of the road, the driving lane ID, the amount of offset from the center line of the driving lane, and the like. The vehicle state acquisition unit F3 acquires the travel speed, acceleration, yaw rate, and the like of the subject vehicle Ma from the vehicle state sensor 12.

The map acquisition unit F4 wirelessly communicates with the map server 3 via the V2X in-vehicle device 14 to acquire the partial map data corresponding to the current position of the subject vehicle Ma. For example, the map acquisition unit F4 requests the map server 3 to acquire partial map data relating to roads that the subject vehicle Ma is scheduled to pass within a predetermined period of time. The partial map data acquired from the map server 3 are stored in, for example, the map holding unit M1. The map holding unit M1 is configured to hold data using a non-volatile memory or the like even when the traveling power source is set to be off. The map holding unit M1 is implemented using a part of the storage area of the storage 23, for example.

Alternatively, the map holding unit M1 may be implemented using a part of the storage area of the RAM 22. Even when the map holding unit M1 is implemented using the RAM 22, it is possible to hold the data even while the driving power supply is turned off by supplying power from the in-vehicle battery to the RAM 22. Further, as another aspect, the map holding unit M1 may be configured such that the stored data disappears when the driving power supply is set to off. The map holding unit M1 is a non-transitional storage medium.

For the sake of convenience, partial map data including the current position will be referred to as current area map data, and the recording range of the current area map data will be referred to as the local map range or current area. Further, the partial map data to be used next is referred to as next area map data. The next area map data corresponds to the partial map data adjacent to the current area map data on the traveling direction side of the subject vehicle Ma. The next area map data corresponds to the partial map data for the area to be entered within a predetermined time. The next area map data may be determined based on the planned travel route. The recording range of the next area map data is also described as the next map range or the next area. When adjacent partial map data are configured to overlap with each other, the local map range (current area) and the next map range (next area) can partially overlap with each other.

The map management unit F5 manages acquisition and holding status of the partial map data corresponding to the traveling direction of the subject vehicle or the planned travel route. For example, the map management unit F5 manages the partial map data acquired by the map acquisition unit F4 and the map data stored in the map holding unit M1. Here, as an example, the map management unit F5 is configured to delete all map data in the map holding unit M1 at least at the timing when the driving power supply is turned off.

Various rules can be applied to the storage rule of the map data downloaded by the map acquisition unit F4 in consideration of the capacity of the map holding unit M1. For example, when the capacity of the map holding unit M1 is relatively small, the map management unit F5 may delete the partial map data for the area from which the subject vehicle Ma has already left immediately after leaving or after a predetermined distance or more. According to such a configuration, the automatic driving device 20 can be realized using the map holding unit M1 having a small capacity. That is, the introduction cost of the automatic driving device 20 can be reduced.

Further, the map management unit F5 may be configured to delete the map data downloaded to the map holding unit M1 after a predetermined time (for example, one day) has passed since the download. Map data for roads that are used on a daily basis, such as commuting roads and school roads, may be cached in the map holding unit M1 as much as possible. For example, map data for roads that are used on a daily basis may be stored unless the free space becomes equal to or less than a predetermined value. The retention period of the downloaded map data may be changed according to the attributes of the data. For example, static map data is stored in the map holding unit M1 up to a certain amount. On the other hand, dynamic map data such as construction information, for example, may be configured to be deleted at the timing when the area corresponding to the dynamic map data is passed.

Figure 5:
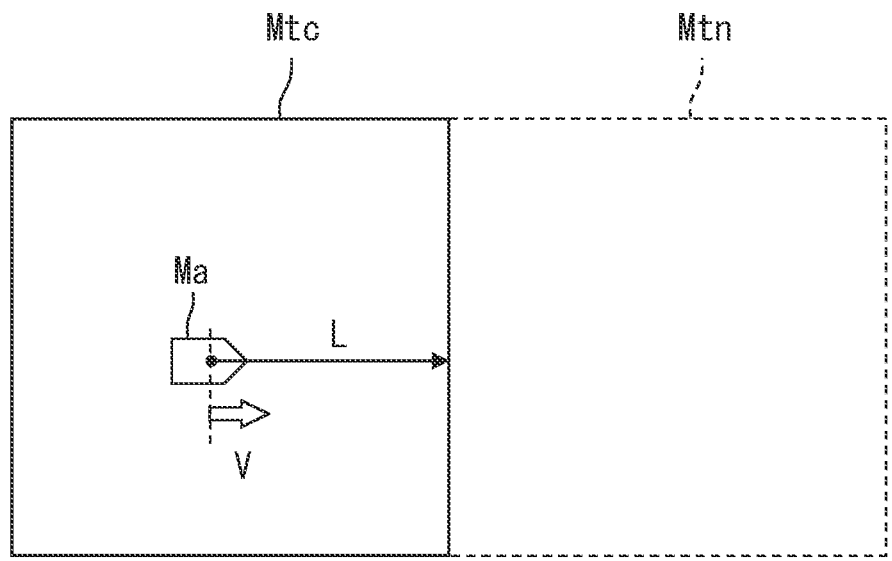
FIG. 5 is a diagram for explaining operation of a map management unit.

Further, the map management unit F5 calculates, for example, the remaining time until the control planning unit F7 or the like starts using the next area map data as a next map use start time Tmx. The timing to start using the next area map data can be, for example, a time when the subject vehicle Ma leaves the local map range. In a case where the next area map data is used when the subject vehicle leaves the local map range, the map management unit F5 calculates, as the next map use start time Tmx, a remaining time until the subject vehicle Ma leaves the local map range based on the current position and travel speed of the subject vehicle Ma. FIG. 5 is a diagram conceptually showing the operation of the map management unit F5 related to the next map use start time. "L" shown in FIG. 5 represents the distance from the current position to the exit point of the local map range. The next map use start time Tmx is determined based on a value obtained by dividing the distance L by the vehicle speed V, for example.

Also, the timing to start using the next area map data can be, for example, a time when the subject vehicle enters the next map range. In a case where the next area map data is used when the subject vehicle Ma enters the next map range, the map management unit F5 calculates the next map use start time Tmx based on the current position of the subject vehicle Ma, the next map range information, and the travel speed of the subject vehicle Ma. In addition, the timing to start using the next area map data is the time when a point located in front of the subject vehicle Ma at a predetermined map reference distance from the subject vehicle Ma is outside the local map range or belongs to the next map range. It is preferable that the map reference distance is set sufficiently longer than, for example, a safety distance described later. For example, the map reference distance may be set to 1.5 times the safe distance. Also, the map reference distance is a fixed value, and may be, for example, 200 m. The map reference distance may be set longer as the travel speed increases. Also, the map reference distance may be changed according to the road type. For example, the map reference distance for motorways may be set longer than the map reference distance for general roads.

The map management unit F5 notifies the control planning unit F7 of the map data acquisition status, such as whether or not the next area map data has been acquired. For example, when the map management unit F5 has not yet acquired the next area map data in a state where the next map use start time Tmx is less than the predetermined preparation time limit, the map management unit F5 outputs the next map use start time Tmx as map acquisition remaining time Tmg to the control planning unit F7. The map acquisition remaining time Tmg corresponds to the remaining time until the next area map data is required in formulating the control plan. The state in which the next area map data is required for formulating the control plan includes a case where the next area map data is used to calculate a potential accident liability value described later. The state in which the next area map data is required may include a case of leaving the local map area and a case of entering the next map area.

Note that the map acquisition remaining time Tmg may be set to a value obtained by subtracting a predetermined margin time from the next map use start time Tmx. The margin time is a time considering communication delay, processing delay after reception, or the like, and may be set to 5 seconds, for example. The remaining map acquisition time Tmg may be shorter than the next map use start time Tmx. The map acquisition remaining time Tmg may be the next map use start time Tmx as it is. The configuration of the present disclosure can be implemented by replacing the remaining map acquisition time Tmg with the next map use start time Tmx. Further, when the next map use start time Tmx is equal to or longer than the predetermined preparation time limit, or when the next area map data has already been acquired, the remaining map acquisition time Tmg is set to a sufficiently large value.

Further, when the next map use start time Tmx is less than the preparation deadline and the next area map data has not yet been acquired, the map management unit F5 may request of the V2X in-vehicle device 14 that communication for acquiring the next area map data is prioritized. The request may be made via the map acquisition unit F4. It is preferable that the preparation deadline is set longer than a first time Th1, which will be described later, such as two minutes.

Figure 6:
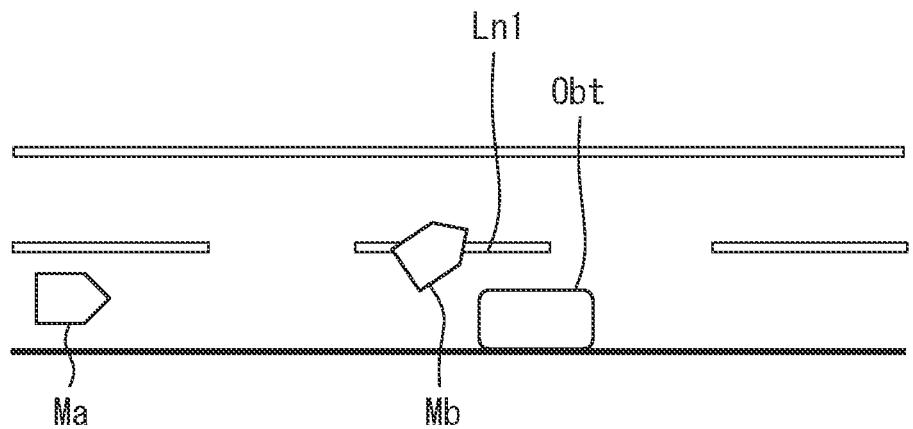
FIG. 6 is a diagram for explaining operation of a consistency determination unit.

The consistency determination unit F51 determines whether the map data is consistent with the real world by comparing the contents indicated by the current area map data acquired by the map acquisition unit F4 with the sensing information of the periphery monitoring sensor 11. For example, when detecting that the forward vehicle Mb has crossed a lane marking Ln1 as shown in FIG. 6, and detecting a stationary object Obt on a lane on which the forward vehicle Mb was traveling, the consistency determination unit F51 determines that the map data is consistent with the real world. The avoidance behavior by the forward vehicle Mb and the detection of the stationary object Obt may be detected based on the sensing information such as the recognition result of the forward camera, for example. It is assumed that information about the stationary object Obt on the road shown in FIG. 6 is not registered in the map data. The stationary object Obt may include vehicles parked on the road, road construction, lane restrictions, falling objects, and the like. When such semi-static information is not reflected in the map data, inconsistency between the map data and the real world may occur.

When the forward vehicle is performing avoidance behavior such as changing lanes in a section where it is possible to go straight on the map, the consistency determination unit F51 determines that the map and the real world are inconsistent. The term "straight traveling" here indicates traveling along the subject vehicle traveling lane so far without changing the traveling position such as the lane change. Here, straight traveling is not necessarily limited to the behavior of traveling while maintaining the steering angle at 0°.

Here, for example, the avoidance behavior is a vehicle behavior for avoiding the obstacle, and for example, the avoidance behavior indicates a change in a traveling position. Here, change in the traveling position indicates changing a position in the lateral direction of the vehicle on the road. The change in the traveling position includes not only the lane change, but also moving the traveling position inside the same lane to either a right corner or a left corner, or the form of traveling across the lane boundary. In order to clarify a difference from a normal lane change, it is preferable that the avoidance action is changing/steering of the traveling position accompanied by deceleration and acceleration thereafter. For example, changing the traveling position accompanied by a deceleration operation or changing the traveling position accompanied by deceleration to a predetermined speed or lower can be regarded as the avoidance behavior. Description on the avoidance behavior indicates a concept of the avoidance behavior assumed in the present disclosure. It is possible to determine whether or not the change of the traveling position as an avoidance behavior has been executed based on the traveling trajectory of the forward vehicle based on the sensing information, the operation history of the direction indicator, and the like.

In addition, when detecting that a plurality of forward vehicles are continuously performing avoidance behaviors in a road section where it is possible to go straight on the map, the consistency determination unit F51 determines that the map data and the real world are inconsistent. Further, the consistency determination unit F51 may determine that the map data and the real world are inconsistent when the feature information indicated by the map data and the feature information represented by the sensing information do not match with each other. Further, the consistency determination unit F51 may determine that the map and the real world are not consistent when the traveling position of the surrounding vehicle is outside the road range indicated by the map data.

Figure 7:
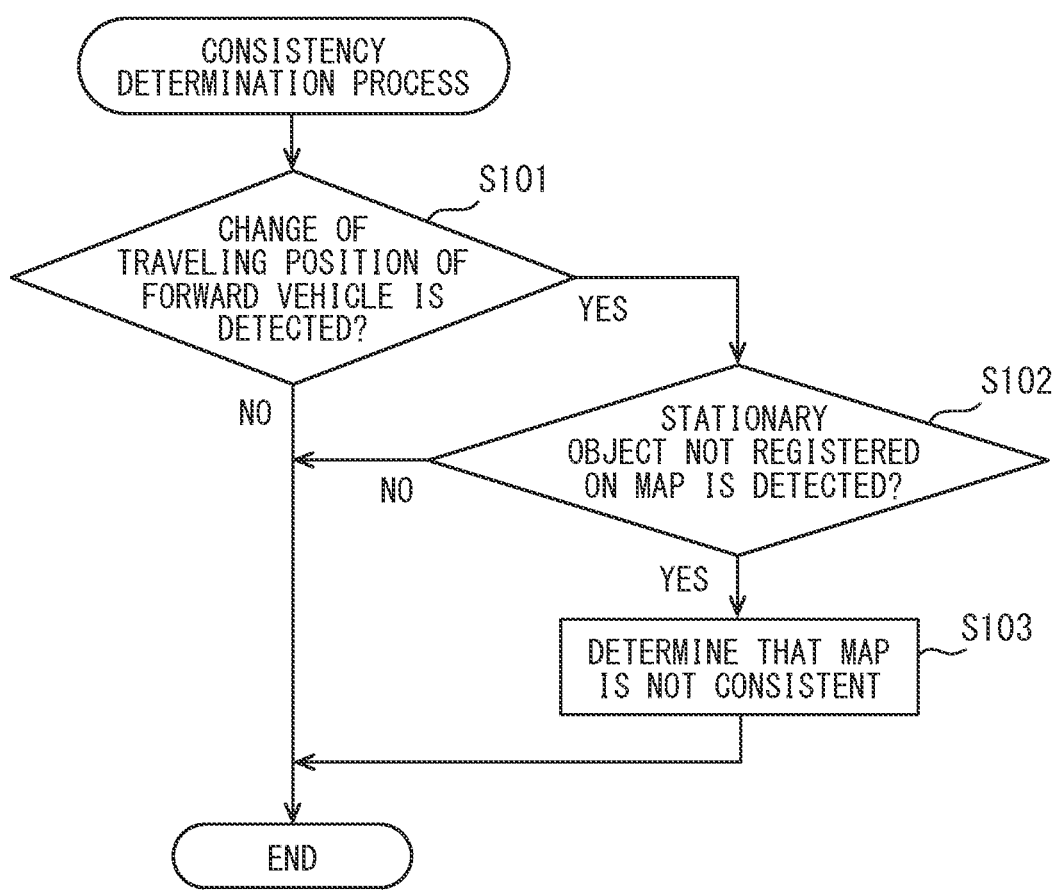
FIG. 7 is a flowchart for explaining the operation of the consistency determination unit.

FIG. 7 shows an example of a consistency determination method by the consistency determination unit F51. The consistency determination process shown in FIG. 7 includes a step S101 of determining whether or not the traveling position of a forward vehicle is out of the lane, and a step S102 of determining whether or not a stationary object not registered in the map data is detected. When the consistency determination unit F51 detects that the traveling position of the forward vehicle has deviated from the lane (S101 YES), and detects a stationary object not registered on the map (S102 YES), the consistency determination unit F51 determines that the map data is not consistent with the real world (S103). Either step S101 or step S102 may be omitted. If step S101 is omitted, the flow may be started from step S102.

The traveling environment recognition unit F6 recognizes the surrounding environment, which is the environment around the subject vehicle Ma, based on the detection result of the periphery monitoring sensor 11. The surrounding environment here includes not only static environmental factors such as the current position, traveling lane, road type, speed limit, relative position to a feature, but also the position and speed of other moving object, the shape and size of surrounding object, and the like. Other moving objects include automobiles as other vehicles, the pedestrian, the bicycle, or the like.

It is preferable that the traveling environment recognizing unit F6 distinguishes whether the surrounding object detected by the periphery monitoring sensor 11 is a moving object or a stationary object. Moreover, it is preferable that the traveling environment recognizing unit F6 distinguishes and recognizes the type of surrounding object. The type of surrounding object can be distinguished and recognized by, for example, performing pattern matching on an image captured by a surrounding monitoring camera. As for types, for example, a structure such as a guardrail, an object falling on the road, a pedestrian, a bicycle, a motorcycle, an automobile, or the like may be distinguished and recognized. If the surrounding object is an automobile, the type of the surrounding object may be a vehicle class, a vehicle type, or the like. Whether the surrounding object is a moving object or a stationary object can be recognized according to the type of the surrounding object. For example, when the type of the surrounding object is a structure or an object falling on the road, the surrounding object may be recognized as a stationary object. When the type of the surrounding object is a pedestrian, a bicycle, a motorcycle, or an automobile, the surrounding object may be recognized as a moving object. An object that is unlikely to move immediately, such as a parked vehicle, may be recognized as a stationary object. Whether or not the vehicle is parked may be determined based on whether the vehicle is stopped and the brake lamp is not lit by image recognition.

The traveling environment recognition unit F6 may acquire the detection results from each of the plurality of periphery monitoring sensors 11 and combine them complementarily to recognize the position and type of an object existing around the vehicle. The position and the speed of the surrounding object may be the relative position and the relative speed with respect to the subject vehicle Ma, or may be an absolute position and an absolute speed with respect to the ground.

Further, the traveling environment recognition unit F6 may recognize a road marking, a position and type of landmark, or a lighting state of a traffic light around the vehicle based on the detection result of the periphery monitoring sensor 11 and the map data. The traveling environment recognition unit F6 specifies, as boundary information related to a boundary of a track, the relative positions and the shapes of the left and right lane markings or road edges of the lane on which the subject vehicle currently travels, by using at least either one of the detection result of the periphery monitoring sensor 11 and the map data. The data acquired by the traveling environment recognition unit F6 from each periphery monitoring sensor 11 may be the observation data, such as the image data, instead of the analysis result. In that case, the traveling environment recognition unit F6 need only specify the surrounding environment including the positions or shapes of the left and right lane markings or road edges based on the observation data of various periphery monitoring sensors 11.

The traveling environment recognition unit F6 may specify the surrounding environment by using other vehicle information received by the V2X in-vehicle device 14 from other vehicles, traffic information received from the roadside device in road-to-vehicle communication, or the like. The traffic information acquired from the roadside device may include road construction information, traffic regulation information, traffic congestion information, weather information, speed limit, lighting state of traffic lights, lighting cycle, and the like.

The control planning unit F7 generates a traveling plan for autonomously driving the subject vehicle Ma by automatic driving, in other words, a control plan by using the traveling environment and the map data specified by the traveling environment recognition unit F6. For example, the control planning unit F7 performs a route search process as a medium to long term travel plan to generate a recommended route from the subject vehicle position to the destination. In addition, the control planning unit F7 generates, as a short-term control plan for performing travel in accordance with the medium to long term travel plan, a lane change travel plan, a travel plan for traveling in a lane center, a travel plan for following a preceding vehicle, and a travel plan for obstacle avoidance.

As a short-term control plan, the control planning unit F7 may generate, as a travel plan, a route that is a certain distance from or in the center of the recognized lane line, or a travel plan that follows the recognized behavior of the preceding vehicle or the travel trajectory. The control planning unit F7 may generate a plan candidate for lane change to an adjacent lane when the traveling road of the subject vehicle corresponds to a road with multiple lanes on one side. The control planning unit F7 may generate a travel plan for passing through the side of the obstacle when it is confirmed that there is an obstacle ahead of the subject vehicle Ma based on the sensing information or the map data. The control planning unit F7 may generate a travel plan that decelerates the subject vehicle to stop in front of the obstacle when it is confirmed that there is an obstacle ahead of the subject vehicle Ma based on the sensing information or the map data. The control planning unit F7 may generate a travel plan determined to be optimal by machine learning or the like.

The control planning unit F7 calculates, for example, one or more plan candidates as short-term travel plan candidates. The plurality of plan candidates differ in acceleration/deceleration amount, jerk, steering amount, and timing of performing various controls. That is, the short-term travel plan may include acceleration/deceleration schedule information for speed adjustment on the calculated route. A plan candidate is also referred to as a route candidate. The action determination unit F73 selects, as a practical execution plan, from among the plurality of control plans, a plan with the smallest potential accident liability value calculated by the responsibility value calculation unit F71, which will be described later, or a plan with the potential accident liability value at an allowable level as the final plan. Note that the map data is used, for example, to specify the area where the vehicle can travel based on the number of lanes and road width, and to set the steering amount and target speed based on the curvature of the road ahead. The map data is also used to calculate a safe distance based on the road structure and traffic rule, and to calculate a potential accident liability value.

The responsibility value calculation unit F71 corresponds to a configuration that evaluates the safety of the travel plan generated by the control planning unit F7. As an example, the responsibility value calculation unit F71 evaluates safety based on whether a distance between the subject vehicle and the surrounding object (hereinafter referred to as a distance between objects) is equal to or greater than a set value of safety distance set by the safe distance setting unit F72.

For example, the responsibility value calculation unit F71 determines, in a case where the subject vehicle Ma travels each plan candidate planned by the control planning unit F7 and an accident occurs in the subject vehicle Ma while traveling the plan candidate, a potential accident liability value that indicates the degree of liability. The potential accident liability value is determined using, as one of the factors, the result of comparison between the inter-vehicle distance and the safety distance between the subject vehicle Ma and a surrounding vehicle when the subject vehicle Ma travels the plan candidate.

The potential accident liability value becomes a smaller value as the liability becomes lower. Therefore, the potential accident liability value becomes a smaller value as the subject vehicle Ma travels safely. For example, when a sufficient inter-vehicle distance is ensured, the potential accident liability value becomes a small value. Also, the potential accident liability value can become a large value when the subject vehicle Ma accelerates or decelerates suddenly.

Further, the responsibility value calculation unit F71 can set the potential accident liability value to a low value when the subject vehicle Ma is traveling according to the traffic rules. In other words, whether or not the route complies with the traffic rules at the position of the subject vehicle can also be used as a factor that affects the value of the potential accident liability value. In order to determine whether the subject vehicle Ma is traveling according to the traffic rules, the responsibility value calculation unit F71 may have a configuration for acquiring the traffic rules of the point where the subject vehicle Ma is traveling. The traffic rules of the point where the subject vehicle Ma is traveling may be acquired from a predetermined database. The traffic rules of the present point may be acquired by analyzing the image captured by the camera that captures the surroundings of the subject vehicle Ma and detecting signs, traffic lights, road markings, and the like. The traffic rules may be included in the map data.

The safe distance setting unit F72 is configured to dynamically set the safe distance according to the driving environment, which is used in the responsibility value calculation unit F71. The safe distance is a reference distance for evaluating safety between the object. As the safety distance, there is a safety distance from the preceding vehicle, that is, a vertical safety distance, and a left-right direction, that is, a lateral safety distance. A mathematical formula model includes models for determining these two types of safety distances. The safe distance setting unit F72 calculates the vertical and lateral safe distances using a mathematical formula model that formulates the concept of safe driving, and sets the calculated values as the current safe distances. The safe distance setting unit F72 calculates and sets the safe distance using at least behavior information such as acceleration of the subject vehicle Ma. Since various models can be adopted as a method for calculating the safe distance, detailed description of the calculation method is omitted here. As a mathematical formula model for calculating the safe distance, for example, a Responsibility Sensitive Safety (RSS) model can be used. Moreover, Safety Force Field (SFF, registered trademark) can also be adopted as a mathematical formula model for calculating the safety distance. The safety distance calculated by the safe distance setting unit F72 using the mathematical formula model is hereinafter also referred to as a standard value dmin of the safety distance. The safe distance setting unit F72 is able to set the safety distance longer than the standard value dmin based on the determination result of the consistency determination unit F51.

The above-described mathematical formula model does not assure that an accident will not occur at all but assures that when a nearby vehicle distance falls below a safe distance, the subject vehicle will not be on the side having responsibility for any accident only by taking an appropriate action for collision avoidance. An example of appropriate action for collision avoidance as used herein is braking with a reasonable force. Braking with a reasonable force includes, for example, braking at the maximum possible deceleration for the subject vehicle. The safe distance calculated by the mathematical formula model can be rephrased as a minimum distance that the subject vehicle should keep between itself and the obstacle in order to avoid the proximity of the subject vehicle and the obstacle.

The action determination unit F73 is configured to determine a final execution plan among a plurality of control plans, based on the potential accident liability value calculated by the responsibility value calculation unit F71, as described above. Further, the control planning unit F7 as the action determining unit F73 determines the final execution plan based on the map acquisition remaining time Tmg input from the map management section F5. The action content based on the map acquisition remaining time Tmg, in other words, a non-acquired map handling process, which is a process for determining the control plan, will be described separately later.

The control signal output unit F8 is configured to output a control signal corresponding to the control plan determined by the action determination unit F73 to the travel actuator 16 and/or the HCU 151 to be controlled. For example, when deceleration is scheduled, the control signal output unit F8 outputs a control signal for realizing the planned deceleration to the brake actuator or electronic throttle. The control signal output unit F8 also outputs a control signal to the HCU 151 for displaying a map icon corresponding to the acquisition status of the partial map data. It should be noted that the output signal of the control signal output unit F8 can be recorded by the operation recording device 17 when a predetermined recording event occurs.

In addition, the automatic driving device 20 outputs data indicating the acquisition status of the partial map data to the operation recording device 17 when an emergency action is taken. The acquisition status of the partial map data includes the ID of the map tile that has been acquired. Whether or not the consistency determination unit F51 has determined that the map data and the real world are not consistent is also output as data indicating the acquisition status of the partial map data.

(Regarding Non-Acquired Map Handling Process)

Figure 8:
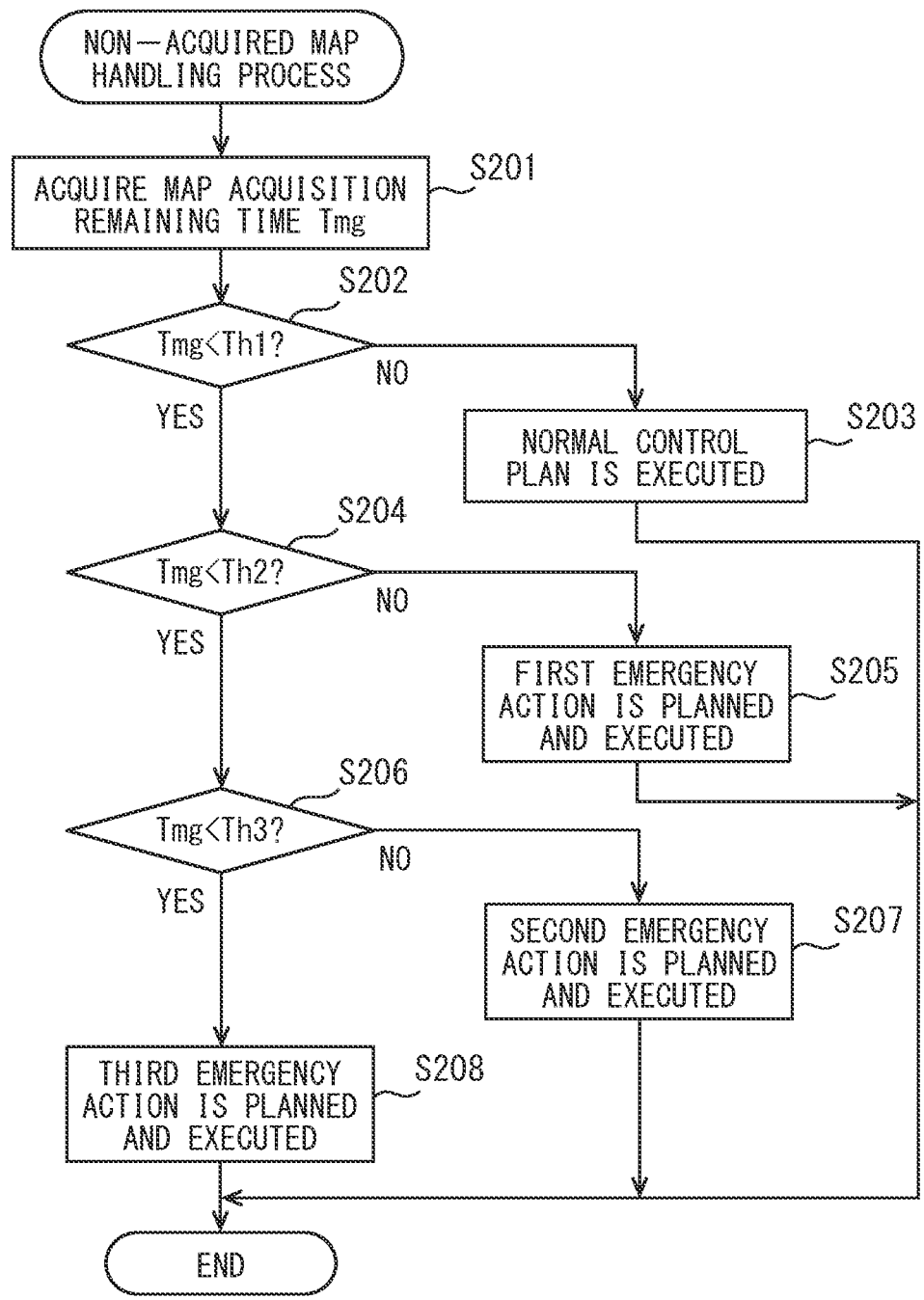
FIG. 8 is a flowchart for explaining a map non-acquisition handling process.

Here, the non-acquired map handling process executed by the control planning unit F7 will be described with reference to the flowchart shown in FIG. 8. The flowchart shown in FIG. 8 is executed at predetermined intervals (for example, every 500 milliseconds) while a predetermined application that uses map data, such as automatic driving, is being executed. As the predetermined application, in addition to the automatic driving application, adaptive cruise control (ACC), lane trace control (LTC), or a navigation application can be adopted. Note that this flow can be omitted when the map management unit F5 has notified that the next area map data has been acquired, that is, when the next area map data has been acquired.

First, in step S201, the map acquisition remaining time Tmg is acquired from the map management unit F5, and step S202 is executed. In step S202, it is determined whether or not the map acquisition remaining time Tmg is less than a predetermined first time Th1. When the map acquisition remaining time Tmg is less than the first time Th1, an affirmative decision is made in step S202 and the process proceeds to step S204. On the other hand, when the map acquisition remaining time Tmg is equal to or longer than the first time Th1, a negative decision is made in step S202 and the process proceeds to step S203. When the next area map data has already been acquired, a negative decision may be made in step S202 and the process may proceed to step S203. The first time Th1 used in this determination is a parameter that functions as a threshold value for determining whether or not it is necessary to perform a first emergency action, which will be described separately below. The first time Th1 is set to, for example, 60 seconds. Note that the first time Th1 may be, for example, 45 seconds, 90 seconds, or 100 seconds.

In step S203, normal control is executed. That is, the control plan determined based on the potential accident liability value is executed among a plurality of plan candidates for autonomously traveling toward the destination.

In step S204, it is determined whether or not the map acquisition remaining time Tmg is less than a predetermined second time Th2. The second time Th2 is set longer than 0 seconds and shorter than the first time Th1. The second time Th2 used in this determination is a parameter that functions as a threshold value for determining whether or not it is necessary to perform a second emergency action, which will be described separately below. The second time Th2 is set to, for example, 30 seconds. Note that the second time Th2 may be, for example, 20 seconds or 40 seconds. When the map acquisition remaining time Tmg is less than the second time Th2, an affirmative decision is made in step S204, and the process proceeds to step S206. On the other hand, when the map acquisition remaining time Tmg is equal to or longer than the second time Th2, a negative determination is made in step S204 and the process proceeds to step S205. Note that, according to this configuration, the case where step S205 is executed is a case where the map acquisition remaining time Tmg is less than the first time Th1 and equal to or longer than the second time Th2.

In step S205, execution of a predetermined first emergency action is planned and started. The first emergency action is, for example, to notify the driver or an operator outside the vehicle that a map that will soon be required to continue automatic driving or the like has not yet been acquired. For the sake of convenience, the process of notifying the crew that the next area map data has not been acquired is also referred to as a map non-acquisition notification process. The content of the notification in the map non-acquisition notification process can be, as described above, information indicating that the map necessary for continuing automatic driving or the like has not been acquired. For example, the map unacquired icon 80A shown in FIG. 3A may be displayed on the display 151 together with a text or voice message.

In addition, the content of the notification in the map non-acquisition notification process may be an image or a voice message indicating that automatic driving may soon be interrupted based on the incompleteness of the map. The above configuration corresponds to a configuration for notifying the crew member or the operator that acquisition of the partial map data has failed. The medium of the notification may be an image or a voice message. As a result of the map non-acquisition notification process, the control signal output unit F8 outputs to the HCU 152 a control signal instructing the display 151 to output the icon image and message image corresponding to the above contents. Note that when the map non-acquisition notification process is executed as the first emergency action, control plans selected from a plurality of plan candidates according to a normal procedure may be executed in parallel.

In step S206, it is determined whether or not the map acquisition remaining time Tmg is less than a predetermined third time Th3. The third time Th3 is set longer than 0 seconds and shorter than the second time Th2. The third time Th3 used in this determination is a parameter that functions as a threshold value for determining whether or not it is necessary to perform a third emergency action, which will be described separately below. The third time Th3 is set to, for example, 10 seconds. Note that the third time Th3 may be, for example, 5 seconds or 15 seconds. When the map acquisition remaining time Tmg is less than the third time Th3, an affirmative decision is made in step S206, and the process proceeds to step S208. On the other hand, when the map acquisition remaining time Tmg is equal to or longer than the third time Th3, a negative determination is made in step S206, and the process proceeds to step S207. According to this configuration, the case where step S207 is executed is the case where the map acquisition remaining time Tmg is less than the second time Th2 and equal to or longer than the third time Th3.

In step S207, execution of a predetermined second emergency action is planned and started. The second emergency action may be, for example, a process of reducing the traveling speed of the vehicle below a predetermined target speed by a predetermined amount. For the sake of convenience, the process of suppressing the travel speed is also referred to as a speed reduction process. By setting the travel speed of the vehicle to a value smaller than the initially planned value, it is possible to lengthen the time until reaching the point where the next area map data is required. That is, the remaining map acquisition time Tmg can be lengthened. Along with this, it is possible to increase the probability that the next area map data can be acquired before reaching the point where the next area map data is required. When it is decided to execute the speed reduction process as the second emergency action, a plan candidate is generated on the premise that the speed reduction process will be executed, and the final deceleration may be determined based on the potential accident liability value. The deceleration amount as the second emergency action may be a fixed value such as 5 km/h or 10 km/h. Further, the target speed after deceleration may be a value obtained by multiplying the initially scheduled target speed by a predetermined coefficient less than one. For example, the target speed after deceleration may be 0.9 times or 0.8 times the initially planned target speed. When the current traveling lane is a passing lane or the like, a lane change to a driving lane may also be planned along with the decision to implement the second emergency action. The driving lane here refers to a lane that is not a passing lane. For example, in Japan, lanes other than the rightmost lane correspond to driving lanes. In Germany, the rightmost lane corresponds to the driving lane. The setting of the passing lane and the driving lane may be changed so as to comply with the traffic rules of the driving area.

In step S208, execution of a predetermined third emergency action is planned and started. The third emergency action may be, for example, MRM. A content of the MRM may be, for example, processing of causing the vehicle to autonomously travel to a safe place and parking the vehicle while issuing a warning to the surroundings. The safe place includes a road shoulder with a width equal to or greater than a predetermined value, or a place defined as an emergency evacuation area. The content of the MRM may be stopping the vehicle in the lane on which the vehicle travels, with a gentle deceleration. As the deceleration in this case, it is preferable to adopt a value equal to or less than 4 [m/s^2], such as 2 [m/s^2] or 3 [m/s^2]. Of course, when it is necessary to avoid a collision with a preceding vehicle, the deceleration exceeding 4 [m/s^2] can be adopted. The deceleration during the MRM may be dynamically decided and sequentially updated in consideration of the traveling speed at the start of MRM and a vehicle-to-vehicle distance to a following vehicle within a range in which stopping is possible within, for example, 10 seconds. Starting MRM is equivalent to starting deceleration for an emergency stop.

(Regarding Inconsistency Handling Process)

Figure 9:
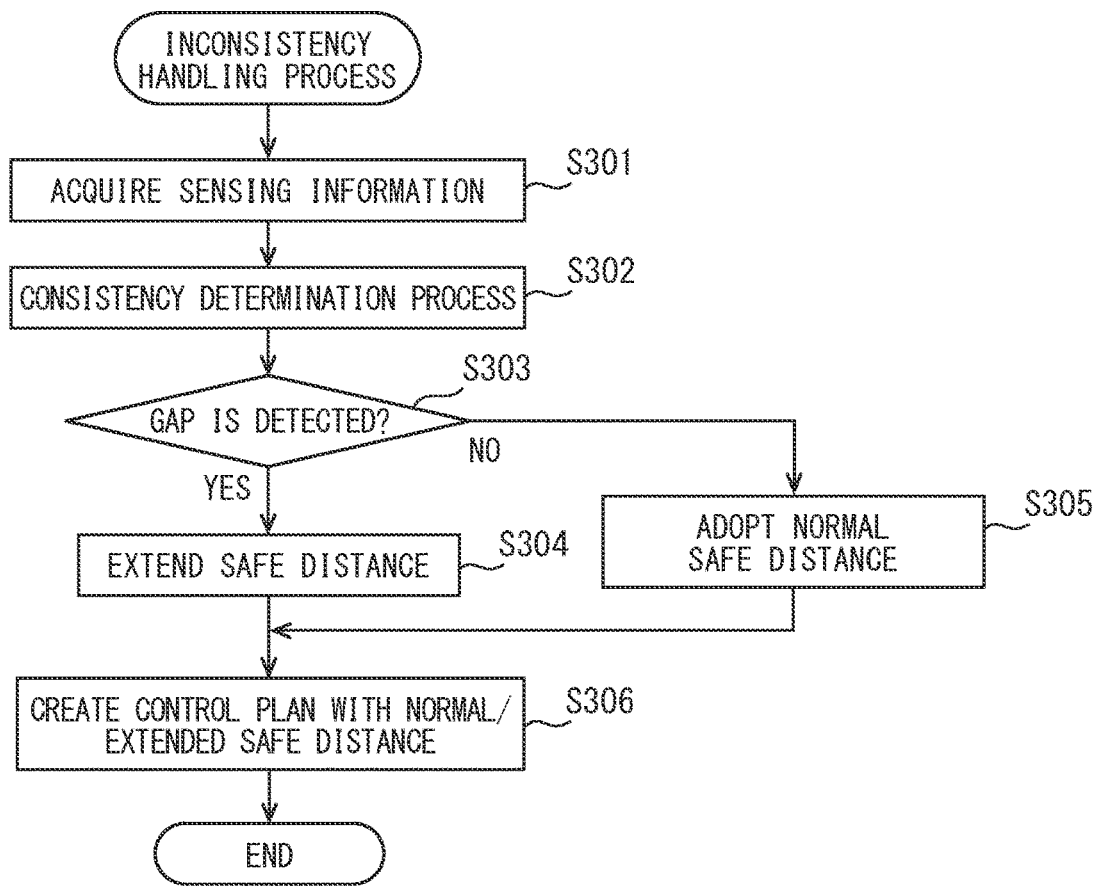
FIG. 9 is a flowchart for explaining an inconsistency handling process.

Here, the inconsistency handling process executed by the automatic driving device 20 will be described using the flowchart shown in FIG. 9. The flowchart shown in FIG. 9 is executed at predetermined intervals (for example, every 200 milliseconds) while a predetermined application that uses map data, such as automatic driving or navigation, is being executed. It should be noted that this flow can be executed sequentially independently of the map non-acquired map handling process shown in FIG. 8, in other words, in parallel. In this embodiment, as an example, the inconsistency handling process includes steps S301 to S306.

First, in step S301, the sensing information of the periphery monitoring sensor 11 is acquired, and the process proceeds to step S302. In step S302, the consistency determination unit F51 performs consistency determination process. The consistency determination process may have the contents described using the flowchart shown in FIG. 7, for example. When it is determined that there is a gap between the map and the real world as a result of step S302, the process proceeds to step S304. On the other hand, when it is not determined that there is a gap between the map and the real world as a result of step S302, the process proceeds to step S305.

In other words, a state in which there is a gap between the map and the real world corresponds to a state in which the map and the real world are not consistent. A state in which the map and the real world are not consistent includes, for example, a state in which there is an obstacle on the road that is not registered, or a state in which a travelable area on the map is actually not travelable. Also, a state in which the road shape shown on the map and the road shape detected by the periphery monitoring sensor 11 are different is also an example of a state in which the map data and the real world are not consistent. The road shape here refers to at least one of the number of lanes, curvature, road width, and the like. For example, the state in which there is a gap between the map and the real world corresponds to a state in which the shape of the road edge shown on the map is different from the shape actually observed by the front camera, or when a landmark that are not registered in the map data is detected. In addition, the state in which there is a gap between the map and the real world corresponds to a state where there is no other vehicle in front, that is, a state where the field of view of the front camera is open and a landmark registered in the map data cannot be detected. The state in which there is a gap between the map and the real world further corresponds to a state in which the color, shape, position, or display content of the signboard registered in the map data differs from the result of image recognition.

In step S304, the safe distance setting unit F72 sets the set value dset of the safe distance to be longer than the standard value dmin. For example, the set value dset of the safety distance can be set as shown in the following Equation 1.

$$d\text{set} = d\text{min} + \varepsilon d \qquad \text{(Equation 1)}$$

Note that εd in Equation 1 is a parameter corresponding to the extension, and is referred to as an extension distance for convenience. For example, the extended distance εd is a value greater than zero. The extension distance εd may be a fixed value such as 20 m or 50 m. Further, the extended distance εd may be dynamically determined according to the speed and acceleration of the subject vehicle Ma. For example, the extension distance εd may be set longer as the vehicle speed increases. Further, the extension distance εd may be set longer as the acceleration of the subject vehicle Ma is larger or as the degree of deceleration is smaller. In addition, the extended distance εd may be adjusted according to the type of road on which the subject vehicle Ma is traveling. For example, when the road on which the subject vehicle Ma is traveling is a general road, the extended distance εd may be set to a smaller value than when the road on which the subject vehicle Ma is traveling is a motorway such as an expressway.

As another aspect, the set value dset of the safety distance may be set as shown in the following Equation 2.

$$d\text{set} = d\text{min} \times \alpha \qquad \text{(Equation 2)}$$

Note that α in Equation 2 is a coefficient for extending the safety distance, and is referred to as an extension coefficient for convenience. The extension coefficient α is a real number greater than one. The extension coefficient α may be a fixed value such as 1.1 or 1.2. Further, the extension coefficient α may be dynamically determined according to the speed and acceleration of the subject vehicle Ma. For example, the expansion coefficient α may be set to a larger value as the vehicle speed increases. Further, the extension coefficient α may be set larger as the acceleration of the subject vehicle Ma is larger or as the degree of deceleration is smaller. In addition, the extension coefficient α may be adjusted according to the type of road on which the subject vehicle Ma is traveling. For example, when the road on which the subject vehicle Ma is traveling is a general road, the extension coefficient α may be set to a smaller value than when the road on which the subject vehicle Ma is traveling is a motorway such as an expressway. When the processing in step S304 is completed, the process proceeds to step S306.

In step S305, the standard value dmin calculated based on a mathematical formula model is set as the setting value dset of the safety distance, and the process proceeds to step S306. In step S306, the control planning unit F7 generates a control plan capable of ensuring the safety distance determined by the above processing. Regarding the control plan generated in step S306, an action to be executed is selected based on the potential accident liability calculated by the responsibility value calculation unit F71.

(Effects of Above-Described Configuration)

According to the above configuration, when the map acquisition remaining time Tmg becomes less than the first time, an emergency action such as notification to the driver's seat occupant is executed. Even when the automatic operation is finally interrupted due to the lack of map data, since there is a prior notification, such a configuration can reduce a case where the interruption of the automatic operation is an unexpected behavior for the user. In other words, the configuration can reduce the possibility that the automatic driving will be interrupted at a timing unexpected by the user. As a result, the fear of confusing the user can be reduced.

Further, when the map acquisition remaining time Tmg becomes less than the second time, the vehicle speed is suppressed as an emergency action. With such a configuration, it is possible to extend the time until the next area map data is required. As a result, it is possible to increase the possibility that the next area map data will be acquired in time. In addition, the user can also expect to perceive that something is wrong with the system based on the fact that the vehicle speed is suppressed more than usual. In other words, even when the automatic driving is eventually interrupted due to the lack of the map data, it is possible to reduce the possibility that the interruption of the automatic driving will result in an unexpected behavior of the user. In addition, in the present disclosure, notification to the driver's seat occupant is carried out before carrying out vehicle speed suppression as an emergency action. According to such a configuration, the occupant in the driver's seat can estimate the reason why the vehicle speed is suppressed, so that it is possible to reduce the possibility that the user is confused or uncomfortable due to the suppression of the vehicle speed.

Furthermore, according to the above configuration, when the map acquisition remaining time Tmg becomes less than the third time Th3 as the predetermined threshold, MRM, that is, deceleration toward a stop is started. According to such a configuration, it is possible to reduce the possibility that the automatic driving is continued without the map data. Further, since MRM is executed within the range where map data is stored, MRM can be executed more safely than when MRM is executed within the range where map data is not stored.

Moreover, according to the above configuration, the safety distance is extended when there is a gap between the map and the real world. The state in which there is a gap between the map and the real world corresponds to a state in which the reliability of the map is impaired. In such a situation, there is a high possibility that the evaluation of each plan candidate, such as the potential accident liability value, will be erroneous. Therefore, safety can be enhanced by temporarily increasing the safety distance longer than the standard value dmin.

(Supplement to Operation of Control Planning Unit F7)

In the above description, as an emergency action based on the map acquisition remaining time Tmg, at least one of notification to the driver's seat occupant, suppression of vehicle speed, and MRM has been disclosed, however the emergency action is not limited thereto. The control planning unit F7 may be able to employ mapless autonomous driving, which is control for continuing autonomous driving without having map data provided by the map server 3, as an emergency action. The mapless autonomous driving can be an operation mode in which the subject vehicle continues to travel using an instant map, which is a map of the vehicle's surroundings generated on the spot based on the detection results of the periphery monitoring sensor 11, for example. The instant map can be generated, for example, by Visual Simultaneous Localization and Mapping (SLAM), which is SLAM based on camera images. An instant map may be generated by sensor fusion. An instant map may be referred to as a simple map, a self-made map, or a sensing map. Further, the mapless autonomous driving may be an operation mode in which the trajectory of the preceding vehicle is adopted as the trajectory of the subject vehicle, and deceleration is performed in response to a merging vehicle or a person crossing the road detected by the periphery monitoring sensor 11. The mapless autonomous driving may be an alternative to MRM, for example.

The control planning unit F7 may employ the mapless autonomous driving as an emergency action according to the surrounding traffic conditions. For example, when the map acquisition remaining time Tmg is less than the second time Th2 or less than the third time Th3, and there are other vehicles on the front, rear, left, and right of the subject vehicle Ma, mapless autonomous driving may be adopted. When there are other vehicles on the front, rear, left, and right of the subject vehicle Ma, it is expected that the safety can be ensured by traveling so as to maintain the inter-vehicle distance from the surrounding vehicles. The condition for adopting the mapless autonomous driving, in other words, the situation can be determined based on the design concept of the vehicle manufacturer. The mapless autonomous driving may be referred to as an exceptional emergency action.

Also, handover request processing may be adopted as an emergency action. The handover request processing, in conjunction with the HMI system 15, corresponds to requesting the occupant in the driver's seat or the operator to take over the driving operation. The handover request processing may be referred to as a handover request. For example, the control planning unit F7 may plan and execute a handover request as an emergency action when the map acquisition remaining time Tmg becomes less than the second time. In addition, the control planning unit F7 may extend the safe distance as an emergency action based on the map acquisition remaining time Tmg becoming less than a predetermined threshold such as the second time Th2. A method similar to step S304 can be adopted as the method for extending the safety distance.

Figure 10:
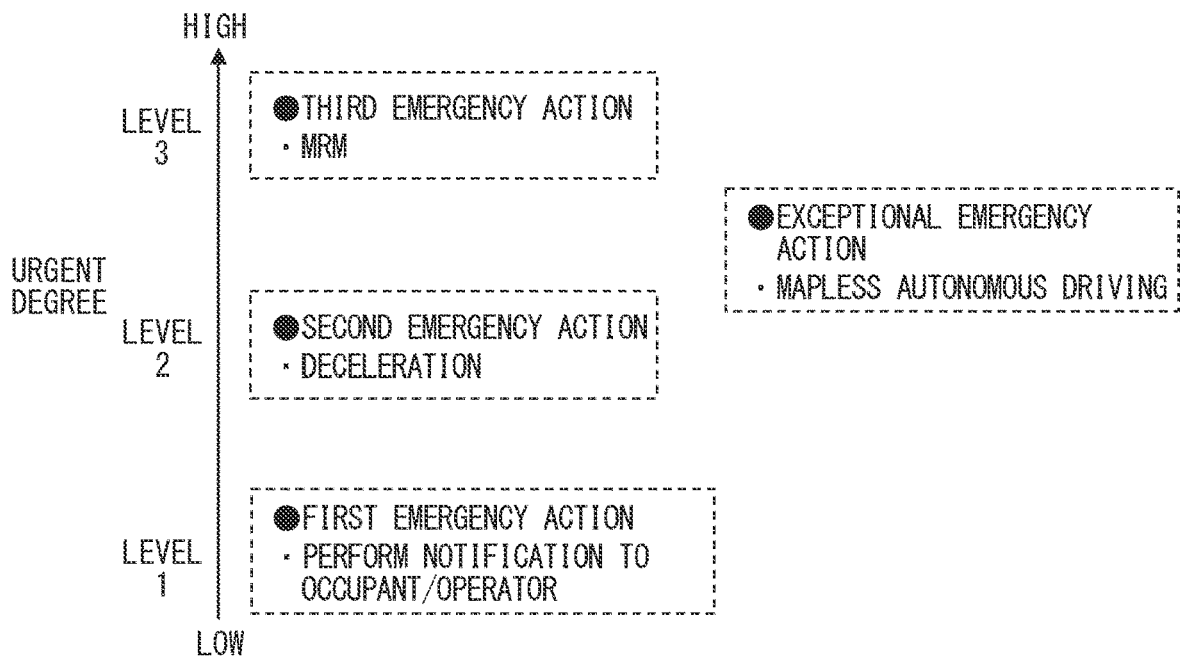
FIG. 10 is a diagram for explaining operation of a control planning unit when a concept of degree of urgency is applied.

Further, the control planning unit F7 may calculate the degree of urgency based on the map acquisition remaining time Tmg and execute an emergency action according to the degree of urgency. The degree of urgency is a parameter that is set higher as the map acquisition remaining time Tmg is shorter. For example, the degree of urgency can be expressed in three stages of levels 1-3. Level 1 may be, for example, a state in which the map acquisition remaining time Tmg is less than the first time Th1 and equal to or longer than the second time Th2. Further, level 2 may be a state in which, for example, the map acquisition remaining time Tmg is less than the second time Th2 and is equal to or longer than the third time Th3. Level 3 may be, for example, a state in which the map acquisition remaining time Tmg is less than the third time Th3. FIG. 10 summarizes an example of an emergency action for each level of urgency. For example, when the degree of urgency is level 1, the control planning unit F7 plans and executes notification to the driver's seat occupant or operator as the first emergency action. Also, when the degree of urgency is level 2, the control planning unit F7 plans and executes a speed suppression process as the second emergency action. Furthermore, when the degree of urgency is level 3, the control planning unit F7 plans and executes MRM as the third emergency action.

Figure 11:
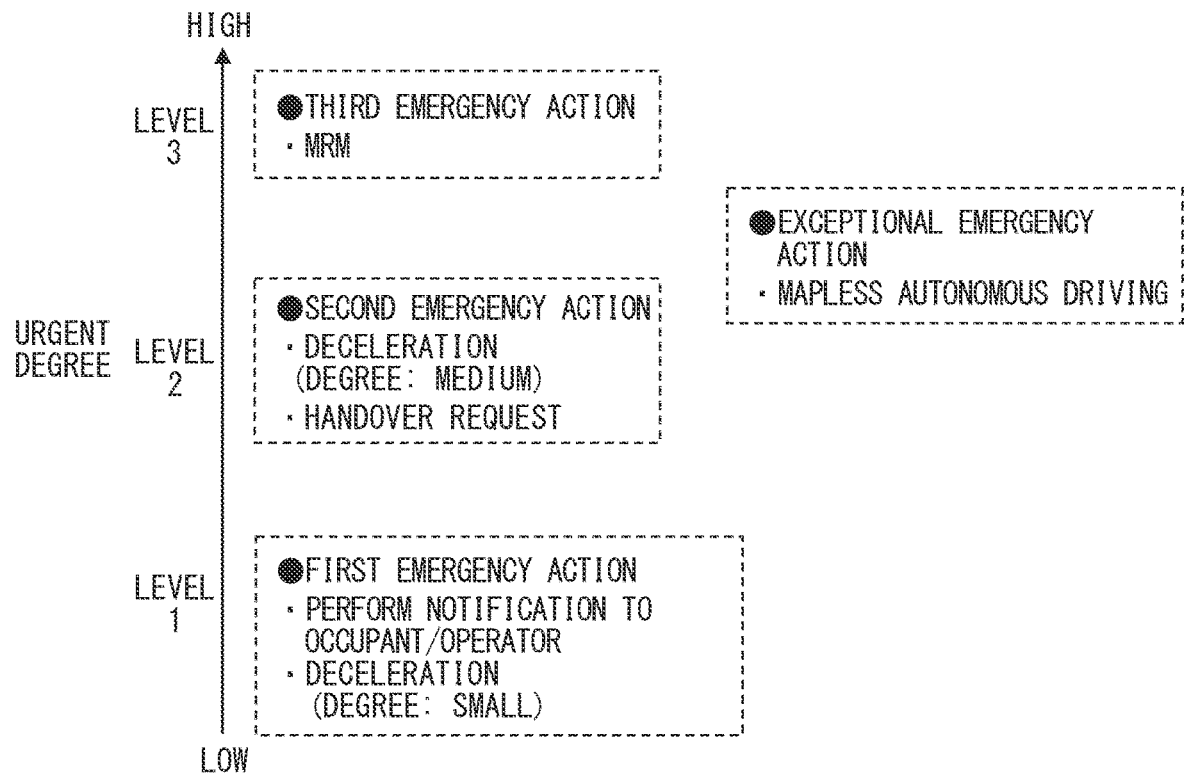
FIG. 11 is a diagram showing a modification of contents of emergency action for each degree of urgency.

The content and combination of emergency actions to be executed according to the degree of urgency or the map acquisition remaining time Tmg can be changed as appropriate. For example, as shown in FIG. 11, as an emergency action when the degree of urgency is level 1, the driver's seat occupant or operator may be notified and speed control processing with a relatively small amount of deceleration may be executed. Further, as an emergency action when the degree of urgency is level 2, a speed control process with a relatively large amount of deceleration may be executed as compared to level 1. The deceleration amount of the speed control process when the urgency is level 1 is smaller than the deceleration amount of the speed control process when the urgency is level 2. For example, when the deceleration amount in the speed control process when the urgency is level 1 is 5 km/h, the deceleration amount in the speed control process when the urgency is level 2 may be 10 km/h. Also, as an emergency action when the degree of urgency is level 2, a handover request may be executed.

Note that the number of levels of urgency and criteria for determination can be changed as appropriate. The degree of urgency may be determined in five stages or more. In addition, the degree of urgency may be determined in consideration of the traffic conditions around the subject vehicle in addition to the map acquisition remaining time Tmg. For example, in a traffic jam, the degree of urgency may be set lower than in a situation that it is not in a traffic jam. This is because there is little possibility that the positional relationship with the surrounding vehicles will suddenly change in a traffic jam. It should be noted that, for example, a traffic jam indicates a state in which there are other vehicles on the front, rear, left, and right of the subject vehicle and the traveling speed is 60 km/h or less.

(Conditions for Termination of Emergency Action)

Figure 12:
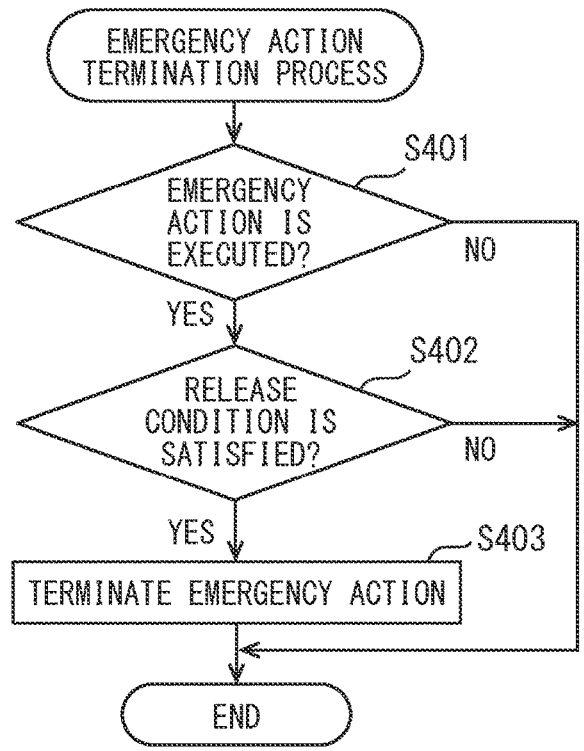
FIG. 12 is a flowchart for explaining emergency action termination process.

Here, the operation of the automatic driving device 20 when terminating the emergency action will be described using the flowchart shown in FIG. 12. The flowchart shown in FIG. 12 is executed at predetermined intervals (for example, every 200 milliseconds) while a predetermined application that uses map data, such as automatic driving or navigation, is being executed. It should be noted that this flow can be sequentially executed independently of the non-acquired map handling process shown in FIG. 8 and the inconsistency handling process shown in FIG. 9. In this embodiment, as an example, the emergency action termination process includes steps S401 to S403. Each step may be executed by the control planning unit F7.

First, in step S401, the control planning unit F7 determines whether or not an emergency action is in progress. When the emergency action is not in progress, this flow is terminated. On the other hand, when the emergency action is in progress, affirmative determination is made in step S401 and step S402 is executed.

In step S402, the control planning unit F7 determines whether or not a predetermined release condition is satisfied. The release condition is a condition for terminating the emergency action currently being executed. For example, when the control planning unit F7 is able to acquire partial map data necessary for continuing automatic operation such as the next area map data, in other words, if the map acquisition remaining time Tmg has recovered to a sufficiently large value, the release condition is determined to be satisfied. Further, the control planning unit F7 may determine that the release condition is satisfied when an operation for acquiring driving operation authority, in other words, an override operation, is performed by the driver's seat occupant or operator. In other words, the control planning unit F7 may determine that the release condition is satisfied when the automatic operation mode is switched to the manual operation mode or the driving assistance mode. Alternatively, the control planning unit F7 may determine that the release condition is satisfied when the vehicle stops.

When the control planning unit F7 determines, in step S402, that the release condition is satisfied, step S403 is executed. On the other hand, when the control planning unit F7 determines that the release condition is not satisfied, this flow is terminated. In that case, the emergency action is continued according to the map acquisition remaining time Tmg or the degree of urgency.

In step S403, the emergency action currently being executed is terminated, and this flow is terminated. For example, when the map non-acquisition notification process is being executed, image display and voice message output are terminated. Further, when the speed suppression process is being executed, the suppression of the target speed is released, and the original target speed is restored. When terminating the emergency action, a notification to the effect that the emergency action will be terminated may be given. The termination of the emergency action is preferably communicated to the driver's seat occupant along with the reason for termination. For example, it may be notified that the emergency action is to be terminated as the map data necessary for automatic driving, that is, the map data for the next area has been obtained.

While the embodiments of the present disclosure have been described above, the present disclosure is not limited to the embodiments described above, and various modifications to be described below are included in the technical scope of the present disclosure, and may be implemented by various modifications within a scope not departing from the spirit of the present disclosure, in addition to the modifications to be described below. For example, various modifications to be described below may be executed in combination as appropriate within a scope of the present disclosure that does not cause technical inconsistency. The components having the same functions as those described in the embodiment described above are denoted by the same reference symbols, and description of the same components will be omitted. When only a part of a configuration is described, the remaining parts of the configuration may employ a preceding configuration described in the embodiment.

(Supplementary Information on Management of Map Data)

As described above, the processing unit 21 serving as the map management unit F5 may cache map data related to roads used on a daily basis, such as commuting routes and school routes, in the map holding unit M1 as much as possible. The map data related to roads used on a daily basis includes, for example, map data with tile IDs that have been downloaded a certain number of times or more, and partial map data for areas within a certain distance from home, work, school, or the like. In addition, the processing unit 21 may store the downloaded map data, not limited to roads that are used on a daily basis, when the capacity of the map holding unit M1 becomes full or when the validity period appropriately set for each map data expires.

For the sake of convenience, the map data stored in the map holding unit M1 is hereinafter also referred to as stored map data. The stored map data here refers to data already saved in the map holding unit M1 at the time when the driving power supply is turned on. In other words, the stored map data refers to the map data acquired during the previous run. The stored map data may be referred to as previously acquired map data. On the other hand, map data downloaded from the map server 3 after the driving power supply is turned on may be referred to as newly acquired map data. Note that the stored map data may also be referred to as cache map data depending on its saving format and saving area.

Figure 13:
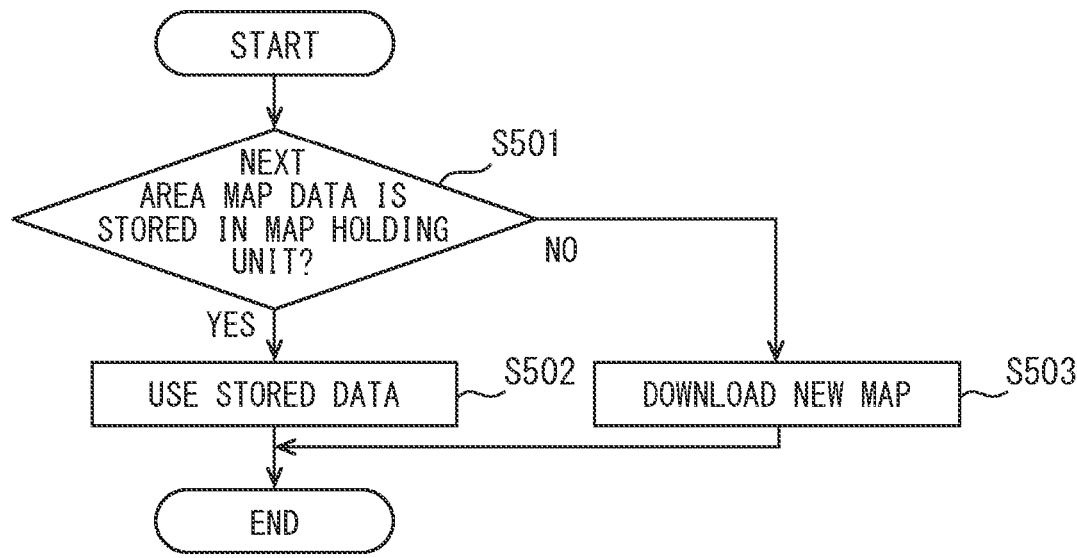
FIG. 13 is a diagram showing an example of a processing flow utilizing stored map data.

The processing unit 21 may actively reuse the map data stored in the map holding unit M1 when the map data is left in the map holding unit M1 even after the driving power source is turned off. For example, the processing unit 21 may determine whether the map data needs to be downloaded according to the processing procedure shown in FIG. 13. The processing flow shown in FIG. 13 may be triggered by, for example, the map data to be used being switched or the remaining time until leaving the current area being less than a predetermined value.

That is, the processing unit 21 refers to the map holding unit M1 based on the fact that the partial map used for generating the control plan has been switched with movement, and determines whether or not the next area map data is stored in the map holding unit M1. (step S501). For example, the map management unit F5 identifies the tile ID of the next area based on the adjacent tile ID linked to the current area map data and the traveling direction of the subject vehicle. Then, the map data having the tile ID of the next area is searched in the map holding unit M1. When there is map data with the tile ID of the next area (step S501 YES), the saved partial map data is adopted as the map data used for control planning (step S502).

Also, when the map data having the tile ID of the next area is not stored in the map holding unit M1 (step S501 NO), the processing unit 21 starts to performs processing for downloading the next area map data from the map server 3 (step S503). The process for downloading map data includes, for example, transmitting a map request signal to the map server 3. The map request signal is a signal requesting distribution of map data, and includes the tile ID of the requested partial map. That is, in S503, a process in which the map request signal including the tile ID of the next area is transmitted and the map data distributed as a response from the map server 3 is received may be included.

The map request signal only needs to contain information that can identify a map tile to be distributed by the map server 3. For example, the map request signal may include, instead of or in combination with the tile ID, the current position and traveling direction of the vehicle. In addition, a case where the map data having the tile ID of the next area is not stored includes a case where the map data having the tile ID of the next area is stored, but the expiration date of the data has expired.

With such a configuration, the frequency and amount of communication with the map server 3 may be suppressed. In addition, when the stored map data is reused, the configuration can reduce the possibility that the map acquisition remaining time Tmg will be less than the predetermined threshold. Therefore, the configuration can reduce the risk of emergency action being taken.

By the way, the stored map data may not be the latest version. For example, the shape or color of a commercial sign registered on a map as a landmark may differ from the shape or color of the real world. When there is a contradiction between what the map shows and the real world, the accuracy of estimating the self-location may deteriorate.

Figure 14:
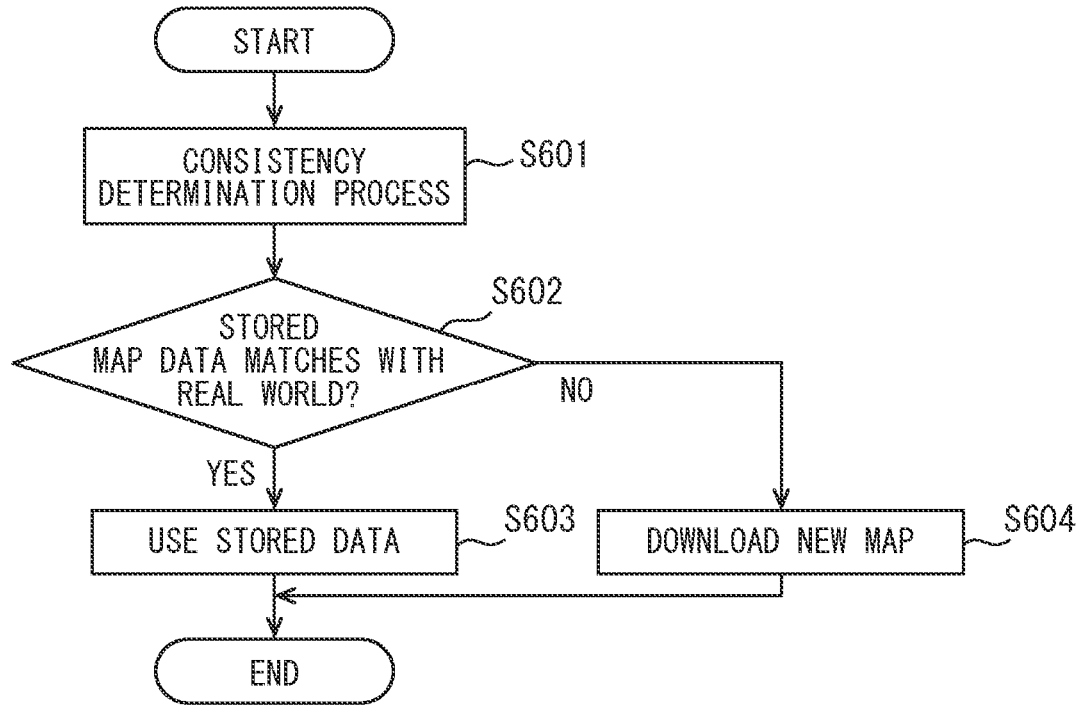
FIG. 14 is a diagram showing an example of a processing flow for re-downloading map data on a condition that the stored map data and the real world are inconsistent.

Based on such circumstances, the processing unit 21 as the consistency determination unit F51 sequentially determines the consistency between the stored map data and the real world as shown in FIG. 14 (step S601). As long as the processing unit 21 determines that the stored map data is consistent with the real world (step S602 YES), the processing unit 21 may continue to use the stored map data (step S603). On the other hand, the processing unit 21 may re-download the partial map data of the current area from the map server 3 (step S604) based on the determination that the stored map data is not consistent with the real world (step S602 NO). The stored map data corresponding to the current area may be deleted or overwritten once the download of the map data is completed. The series of processes shown in FIG. 14 may be performed periodically, for example, every second while the stored map data is being used.

When the processing unit 21 determines that the stored map data is not consistent with the real world, the map management unit F5 confirms whether the stored map data is the latest version by communicating with the map server 3. Whether or not the stored map data is the latest version may be confirmed by transmitting the version information of the stored map data to the map server 3 or by acquiring the latest version information of the map data of the current area from the map server 3. When the stored map data is the latest version, there is no point in re-downloading the map data, so that step S604 may be omitted. In that case, in order to improve robustness, the control conditions may be changed, such as the above-described inconsistency handling process and the control of the traveling speed.

It should be noted that the processing unit 21 as the consistency determination unit F51 may evaluate the consistency by a percentage from 0% to 100%, for example, instead of evaluating whether the stored map data is consistent with the real world. A score value indicating consistency is hereinafter also referred to as a consistency rate. The consistency determination unit F51 may determine that the stored map data is not consistent with the real world based on the determination that the consistency rate is equal to or less than a predetermined value. In addition, in order to suppress the effect of momentary noise, the consistency determination unit F51 may determine that the stored map data is not consistent with the real world when the evaluation result in that the consistency rate is equal to or less than a predetermined value is continuously acquired for a predetermined time or longer.

In addition, when an affirmative determination in step S501 or step S602 is made, the map management unit F5 may refer to the date of acquisition of the stored map data, and use the stored map data in a case where the elapsed time from the date of acquisition is less than a predetermined threshold value. In other words, when certain stored map data is read out, the map management unit F5 may re-download map data of the current area from the map server 3 in a case where the elapsed time from the date of acquisition is equal to more than a predetermined threshold value.

Further, the processing unit 21 may basically perform travel control using the map data newly acquired from the map server 3 even in the configuration where the map data is left in the map holding unit M1. The processing unit 21 may generate and execute a control plan using the map data stored in the map holding unit M1 only when partial map data cannot be acquired from the map server 3 due to a communication failure or the like. Such a configuration corresponds to passively reusing the stored map data.

Figure 15:
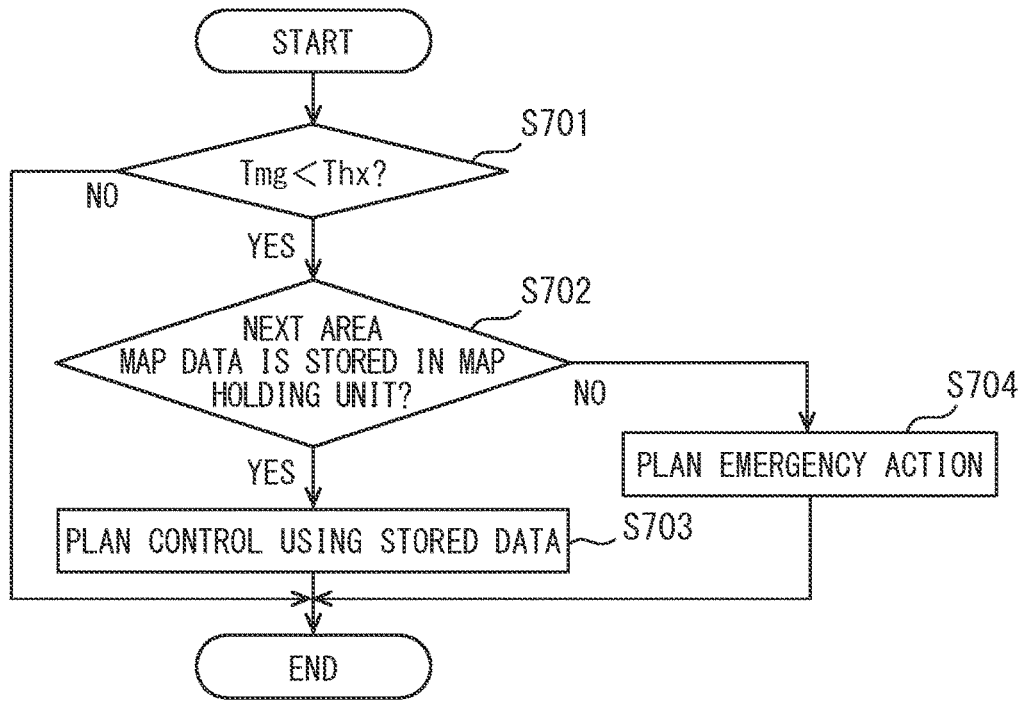
FIG. 15 is a diagram showing another example of a processing flow utilizing the stored map data.

FIG. 15 is a flowchart showing an example of the operation of the processing unit 21 corresponding to the above technical idea. The flowchart shown in FIG. 15 may be executed in a situation where the next area map data cannot be acquired from the map server 3, for example. The processing flow shown in FIG. 15 can be implemented in parallel with, in combination with, or in place of the above-described various processing such as the processing shown in FIG. 8, for example. For example, the processing flow shown in FIG. 15 can be executed as processing when a negative determination is made in step S204. The processing shown in FIG. 15 includes steps S701 to S704.

In step S701, the processing unit F21 determines whether or not the map acquisition remaining time Tmg is less than a predetermined cache usage threshold Thx. The cache usage threshold Thx is set to a value longer than the third time Th3, such as 15 seconds or 30 seconds. The cache usage threshold Thx may be the same as the first time Th1 or the second time Th2 described above. The cache usage threshold Thx may be prepared as a parameter independent of the above threshold.

When the map acquisition remaining time Tmg is equal to or greater than the predetermined cache usage threshold Thx (step S701 NO), the processing unit 21 temporarily terminates the flow shown in FIG. 15. In that case, the processing unit 21 may re-execute the processing flow shown in FIG. 15 after a predetermined period of time on condition that the next area map data has not been acquired. On the other hand, when the map acquisition remaining time Tmg is less than the predetermined cache usage threshold Thx (step S701 YES), the processing unit 21 determines whether or not the map data having the tile ID of the next area is stored in the map holding unit M1. When the partial map data for the next area is stored in the map holding unit M1 (step S702 YES), the stored partial map data is used to generate a control plan for the next area (step S703). On the other hand, when the partial map data for the next area is not stored in the map holding unit M1 (step S702 NO), an emergency action is adopted according to the map acquisition remaining time Tmg.

A situation in which the map acquisition remaining time Tmg is less than the cache usage threshold Thx corresponds to a situation in which the partial map data of the next area is necessary for generating a control plan. In addition, the timing at which the map acquisition remaining time Tmg becomes 0 seconds, the timing at which the current area is exited, and the like may also correspond to a situation in which the partial map data of the next area is necessary for generating a control plan. Note that the processing unit 21 may perform processing for periodically downloading the next/current area map data from the map server 3 even when the stored map data is started to be used in step S703. Then, when the next/current area map data can be acquired from the map data due to recovery of the communication state, or the like, control may be executed using the map data acquired from the map server 3 instead of the stored map data.

As described above, when the stored map data is used, errors in self-position estimation (localization) may increase due to an old map. In view of such a concern, the processing unit 21 may have different control modes/operations depending on whether stored map data is used or map data newly downloaded from the map server 3 is used.

Figure 16:
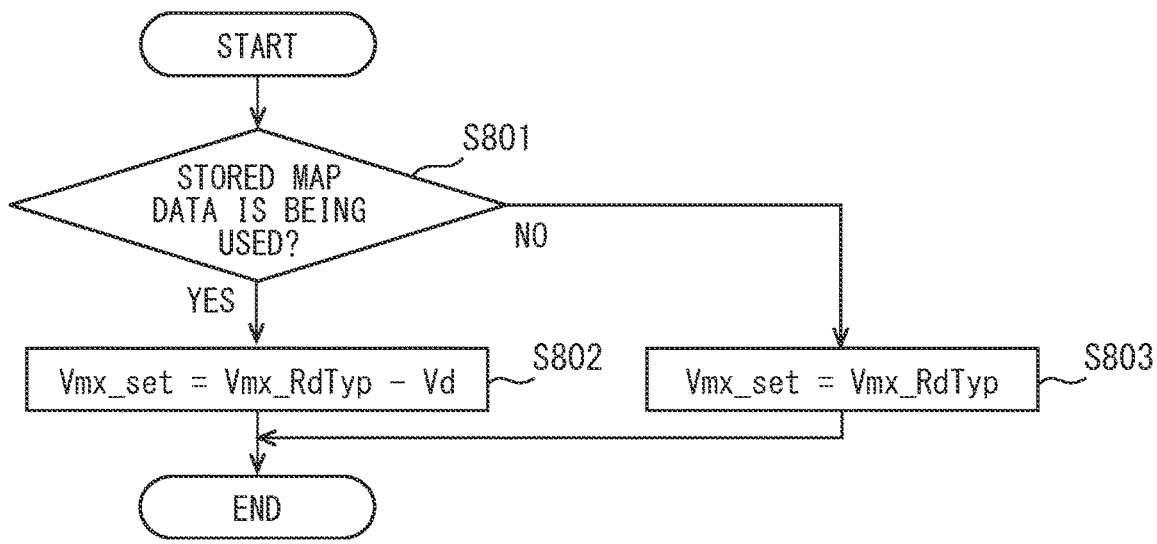
FIG. 16 is a diagram showing an example of a processing flow for changing a set value of an upper limit speed used in a control plan depending on whether or not the map data used in the control plan is stored map data.

For example, as shown in FIG. 16, when the stored map data is not used (step S801 NO), the processing unit 21 sets the upper limit of traveling speed allowed in the control plan to the standard upper limit value according to the type of road (step S802). Vmx_set in FIG. 16 is a parameter indicating the upper limit of the allowable traveling speed, that is, the set value of the upper limit speed. Vmx_RdTyp is a parameter indicating a standard upper limit value according to the type of road. The case where the stored map data is not used corresponds to the case where the partial map data acquired from the map server 3 is used to generate a control plan or the like.

As the standard upper limit value, for example, a value according to the type of road, for example, a highway, a general road, or the like is applied. For example, when the road is a highway, the upper limit is set to 120 km/h, while when the road is a general road, the upper limit is set to 60 km/h. The standard upper limit value for each road type may be set to any value by a user. As for the standard upper limit, the speed limit set for each road may be applied. The speed limit may be determined by referring to the map data, or may be specified by recognizing an image of a speed limit sign. Change of the set value of the upper limit speed used in the control plan corresponds to change of the control condition. Furthermore, the standard upper limit value may be set based on the average speed of surrounding vehicles in order to realize a smooth flow of traffic. The average speed of the surrounding vehicle may be calculated based on the speed of the vehicle observed by the periphery monitoring sensor 11, or may be calculated based on the speed information of other vehicle received through inter-vehicle communication.

On the other hand, when the stored map data is being used (step S801 YES), the upper limit of traveling speed allowed in the control plan is set to a value acquired by subtracting a predetermined suppression amount from the standard upper limit value according to the type of travel road (step S803). Vdp in FIG. 16 is a parameter representing the amount of suppression. The amount of suppression may be a constant value such as 10 km/h, or may be a value corresponding to 10% or 20% of the standard upper limit value according to the road type.

According to the above configuration, when the subject vehicle travels using the stored map data, the maximum speed can be suppressed more than when the subject vehicle travels using the newly acquired map data. When the travel speed is suppressed, the robustness is improved, so the risk of interruption of the autonomous travel control can be reduced.

In a configuration where the consistency determination unit F51 calculates the degree of inconsistency between the map data and the real world, in other words, calculates consistency rate, the processing unit 21 may change the control condition according to the consistency rate. For example, the suppression amount (Vd) gets larger as the consistency rate is the lower. Specifically, when the consistency rate is 95% or more, the suppression amount (Vd) may be set to 0, and when the consistency rate is 90% or more and less than 95%, the suppression amount may be set to 5 km/h. Further, when the consistency rate is 90% or less, the suppression amount may be set to 10 km/h or more. For example, when the consistency rate is less than 80%, the suppression amount may be set to 15 km/h.

Furthermore, the processing unit 21 operates in a mode in which an automatic overtaking control can be executed when the consistency rate is equal to or greater than a predetermined threshold, while the processing unit 21 prohibits the mode in which the automatic overtaking control can be executed when the consistency rate is less than the threshold. The automatic overtaking control refers to a series of controls including moving to the passing lane, accelerating, and returning to the driving lane.

Note that the processing unit 21 may generate a control plan by preferentially using the detection result of the periphery monitoring sensor 11 over the map data when the consistency rate is equal to or less than a predetermined threshold. In addition, when the consistency rate is less than the predetermined threshold, the processing unit 21 may generate a plan to follow the preceding vehicle more aggressively than when the consistency rate is equal to or greater than the predetermined threshold. For example, even in a scene in which overtaking control is normally performed, when the consistency rate is less than a predetermined threshold, control may be planned and executed to follow the preceding vehicle without overtaking. The term "normally" as used herein refers to a case where the consistency rate is equal to or higher than a predetermined threshold. This configuration can reduce the risk of sudden acceleration/deceleration or sudden steering due to incomplete map data.

Figure 17:
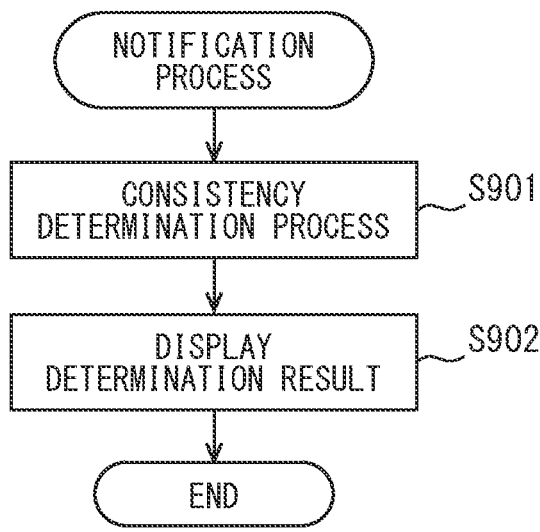
FIG. 17 is a diagram showing an example of a processing flow for notifying a determination result of consistency between map data and the real world.

As shown in FIG. 17, the processing unit 21 may display an icon image indicating the determination result of the consistency determination unit F51 on the display 151 (step S902). Note that step S901 indicates a step in which the consistency determination unit F51 determines consistency. When determining that the map data is consistent with the real world, the processing unit 21 may display an image indicating that the map data is consistent with the real world. When determining that the map data is consistent with the real world, the processing unit 21 may not display an image indicating that the map data is consistent with the real world. The processing unit 21 may display a detection result, that is, an image indicating that an inconsistent between the map data and the real world is detected only when the map data is not consistent with the real world.

Further, when the processing unit 21 detects inconsistency between the map data and the real world, the processing unit 21 may display a specific inconsistent point at which the inconsistency occurs. For example, when the display 151 is the center display, the processing unit 21 may display an image in which a marker image indicating an inconsistent portion is superimposed on the map image. Further, when a HUD is provided as the display 151, the processing unit 21 may use the HUD to superimpose the marker image indicating the inconsistent portion on the actual inconsistent portion. When the automatic driving device 20 is in the level 3 mode, the driver's seat occupant can be expected to look ahead. Therefore, according to the configuration in which the HUD superimposes the inconsistent portion on the foreground, the occupant in the driver's seat can recognize the inconsistent portion without looking away from the front.

Furthermore, when the processing unit 21 detects inconsistency between the map data and the real world, the processing unit 21 may notify the driver seat occupant of the inconsistency via a HUD or the like, and request of the driver seat occupant to select a future control policy. Options for the future control policy include, for example, switching to manual driving, or continuation of automatic driving with reduced vehicle speed. Switching to manual operation includes transitioning to level 2 mode or level 1 mode. An instruction from the occupant in the driver's seat is acquired, for example, by operating a switch, operating a pedal, or gripping a steering wheel. Note that the response instruction to the inconsistency between the map and the reality may be acquired based on line of sight, gesture, voice recognition, or the like. The line of sight and gesture may be extracted by analyzing an image from a camera installed in the vehicle to capture the driver's seat occupant.

When the operation mode of the automatic driving device 20 is the level 4 mode, the occupant in the driver's seat is not always looking forward. In addition, there is a possibility that the user is operating a smartphone or reading a book as a second task. Under such circumstances, it is difficult for the occupant in the driver's seat to notice even when an image requesting an instruction input for the future control policy is displayed on the HUD or center display. In the level 4 mode, after guiding the line of sight of the occupant in the driver's seat to the display 151 by means of vibration, voice, or the like, the inconsistency may be notified and the instruction input may be requested.

It should be noted that presenting too much or too detailed information to the occupant may annoy the occupant. Under these circumstances, when the inconsistency between the map data and the real world is detected, the content to be notified to the occupants may be only the detection of the inconsistency between the map data and the real world, without any specific content. Also, the image displayed in step S902 may be a status display indicating whether or not the map data is consistent with the reality world. In addition, when the inconsistency is notified frequently, the occupants may become distrustful of the system. Under such circumstances, the number of notifications that an inconsistency between the map data and the real world has been detected may be limited so that the number of notifications within a certain period of time is equal to or less than a predetermined value. In addition, the notification of the detection of inconsistency between the map and the real world may be executed as an advance notice only when processing to deal with a map inadequacy is executed, such as vehicle speed suppression, handover request, or the like. Notification of detection of inconsistency between the map and the real world may be stopped while the vehicle speed is being suppressed, the preceding vehicle is being followed, or the subject vehicle is being driven manually.

(Example of Use of Vehicle-to-Vehicle Communication)

For example, the map acquisition unit F4 acquires partial map data from the map server 3 in principle from the viewpoint of data reliability. The map acquisition unit F4 may acquire partial map data from surrounding vehicle when the map acquisition remaining time Tmg becomes less than a threshold value. For example, by cooperating with the V2X in-vehicle device 14, the map data of the current area/next area may be acquired from the surrounding vehicle by requesting the surrounding vehicle for the next area map data. Such control of acquiring partial map data from another vehicle through vehicle-to-vehicle communication may also be employed as an emergency action.

This configuration can reduce the possibility that automatic driving will be interrupted when a difficulty occurs in the wide area communication network or the wide area communication unit of the V2X in-vehicle device 14. Note that the map data acquired from the surrounding vehicle may be used as temporary map data until the map data is acquired from the map server 3. Further, it is preferable that the map data acquired from the surrounding vehicles is attached with an electronic certificate that ensures the reliability of the data. The certificate information can be information including issuer information, a code for ensuring reliability, and the like.

In relation to the above configuration, the vehicles, in other words, the automatic driving devices 20 of the respective vehicles may share the freshness information of the map data of the current area or the next area stored by themselves through vehicle-to-vehicle communication. The freshness information may be downloaded date and time information, or may be version information. Then, when it is detected that another device has newer map data than the subject device as the map data of the current area or the next area, the processing unit 21 acquires the map data from the other device through the vehicle-to-vehicle communication. The other device here refers to an automatic driving device or a driving support device mounted on another vehicle. The other device may be any device that uses map data. The expression other device as a communication partner can be replaced with another vehicle, the other vehicle, or a peripheral vehicle. The other vehicle is not limited to a vehicle traveling in front of the subject vehicle, and may be a vehicle positioned to the side or rear of the vehicle.

In addition, the processing unit 21 may notify the following vehicle of the existence of the inconsistent portion through the vehicle-to-vehicle communication when an inconsistent portion resulting from construction/lane regulation or the like is detected. In addition, the processing unit 21 may acquire the inconsistent portion detected by the preceding vehicle from the preceding vehicle the vehicle-to-vehicle communication.

(Example of Use of Instant Map)

Figure 18:
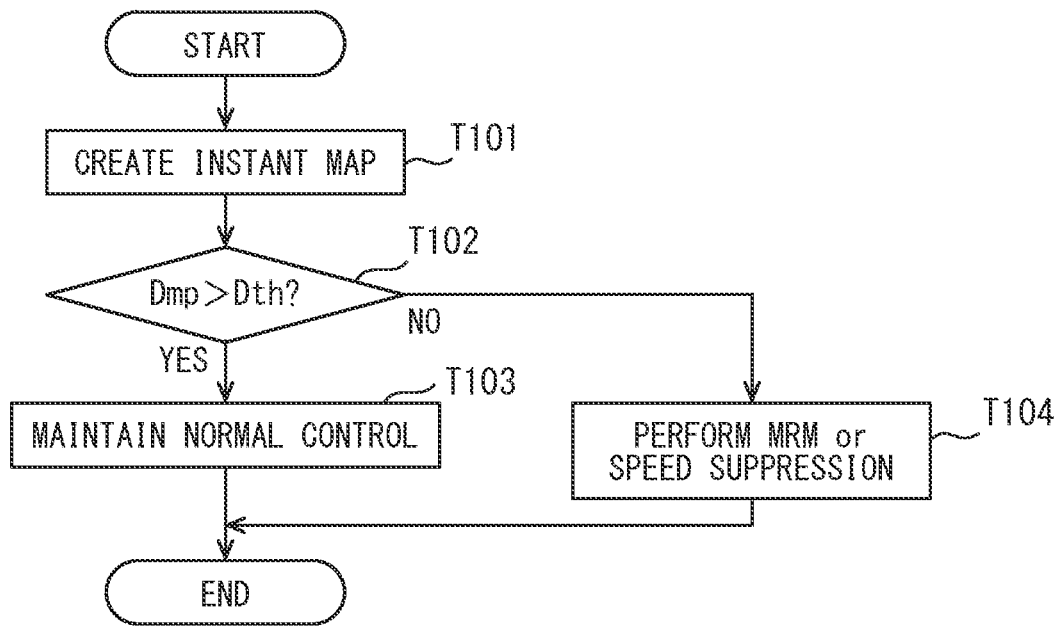
FIG. 18 is a diagram showing an example of a processing flow for changing control according to distance at which an instant map can be generated.

As described above, as one of the emergency actions when the map data cannot be acquired, the processing unit 21 may generate an instant map based on the detection result of the periphery monitoring sensor 11, and generate and execute a control plan to continue autonomous travel using the instant map. Further, the processing unit 21 may change its behavior according to a mapping distance Dmp, which is a distance range within which an instant map can be generated. For example, as shown in FIG. 18, when the instant map has been generated up to a predetermined function maintaining distance Dth or more (step T102 YES), the processing unit 21 maintains normal control (step T103). On the other hand, when the mapping distance Dmp is less than the function maintaining distance Dth (step T102 NO), a process of suppressing the MRM or travel speed by a predetermined amount is executed (step T104).

Note that step T101 shown in FIG. 18 indicates a process for generating an instant map in real time using the detection result of the periphery monitoring sensor 11. Step T101 can be executed sequentially, for example in 100 ms or 200 ms. The mapping distance Dmp corresponds to a distance at which the periphery monitoring sensor 11 can detect the target. The mapping distance Dmp can be, for example, the distance at which the left and right marking lines of the ego lane can be recognized. Also, the mapping distance Dmp may be the distance at which the left or right side of the road can be recognized.

The function maintaining distance Dth may be a constant value such as 50 m, or may be a variable value determined according to the speed. For example, the function maintaining distance Dth may be a value acquired by adding a predetermined margin to a required MRM distance Dmrm, which is a distance traveled until the vehicle stops at the MRM. The MRM required distance Dmrm is determined from the negative acceleration (that is, deceleration) used in MRM and the current speed with the aid of the equation of uniformly accelerated motion. That is, Dmrm is determined by Dmrm=Vo^2/(2a) where Vo is the current speed and a is the deceleration. Note that the deceleration used in MRM may be dynamically determined so that a complete stop is possible within 10 seconds.

The processing unit 21 continues traveling without performing MRM when the instant map is generated farther than the MRM required distance Dmrm. Note that the processing unit 21 may suppress the upper limit of the speed while using the instant map even when the mapping distance Dmp is equal to or greater than the function maintaining distance Dth. The required MRM distance Dmrm becomes shorter as the vehicle speed becomes lower. Therefore, according to the configuration in which the vehicle speed is suppressed while the instant map is being used, it is possible to further reduce the possibility that the MRM will be executed. A scene in which the instant map is used corresponds to a scene in which the map data required for the control plan cannot be received through communication with the map server 3.

(Response to Capturing Prohibited Area)

Depending on the area where this system is used, there may be areas where photography is prohibited, where the camera cannot be pointed. As the capturing prohibited area, for example, military facilities, military residential areas, airports, harbors, royal palaces, government facilities, and the like, and their surroundings are assumed. The map server 3 may distribute the location information of the capturing prohibited areas registered by the map manager or the like to each vehicle. When the processing unit 21 acquires the position information of the capturing prohibited area from the map server 3, the processing unit 21 may execute the handover request based on the position information of the capturing prohibited area.

For example, as shown in FIG. 19, when the processing unit 21 detects that there is a capturing prohibited area in front of the subject vehicle based on the distribution information from the map server 3 (step T201 YES), the processing unit 21 calculates a remaining time Trmn for reaching the capturing prohibited area (step T202). Then, when the remaining time Trmn until reaching the capturing prohibited area is less than a predetermined threshold Tho (step T203 YES), a handover request is started (step T204). After that, when a response is acquired from the driver's seat occupant within a predetermined time (step T205 YES), the driving authority is transferred to the driver's seat occupant and a notification to that effect is carried out (step T206). On the other hand, when no response is acquired from the occupant in the driver's seat even after the predetermined time has passed (step T205 NO), MRM is executed.

A threshold Dho for the remaining time Trmn is set sufficiently longer than a predetermined standard takeover time, such as 20 seconds. The standard handover time is a response waiting time when a handover request is made due to dynamic factors, such as parking on the road or lane restrictions, and is set to 6 seconds, 7 seconds, or 10 seconds, for example. The response waiting time for the handover request due to approaching a capturing prohibited area is also set longer than the standard handover time, such as 15 seconds.

The above configuration can transfer authority with more time compared with a case where a handover is requested due to a dynamic factor. In the above, we have described a configuration that systematically executes handover based on the location information of capturing prohibited area, but it is also assumed that the generation and distribution of map data near capturing prohibited area is prohibited based on laws and ordinances. The map server 3 may distribute the location information of distribution prohibited areas for which maps are not prepared based on laws or the like instead of or together with the information of the capturing prohibited areas. The flow of FIG. 19 can be implemented by replacing the expression capturing prohibited area with distribution prohibited area. That is, the processing unit 21 may systematically initiate a handover request based on the remaining time/distance to reach the distribution prohibited area.

Note that the processing unit 21 may display that automatic driving is possible when the vehicle moves to an area where automatic driving is possible, such as when exiting a capturing prohibited area or when exiting a distribution prohibited area. Moving to an area where automatic driving is possible corresponds to moving within the ODD. Note that notification that the automatic driving function can be used may be performed using a notification sound or a voice message in combination. Alternatively, notification that the automatic driving function can be used may be performed by lighting or blinking a light-emitting element such as an LED provided on the steering wheel or by vibrating the steering wheel. The processing unit 21 may calculate the remaining distance/time until exiting the capturing prohibited area or distribution prohibited area, or the remaining distance/time until automatic driving becomes possible, and display it on the HUD or the like.

(Appendix (Part 1))

"Emergency" in the present disclosure refers to a state in which map data necessary for continuing the automatic driving control is incomplete. In other words, the state in which the map data necessary for continuing the automatic driving control can be acquired paradoxically corresponds to a normal state. A state where the partial map data acquired by the map acquisition unit F4 is incomplete includes, for example, a state where a part of the map data set necessary for implementing the automatic driving control, such as the next area map data, may be incapable of being acquired, that is, the part of the map data set is lost due to a communication delay. The state in which the map data acquired by the map acquisition unit F4 is incomplete includes a state in which there is a gap with the real world. The state in which the map data acquired by the map acquisition unit F4 is incomplete includes a state in which the update date and time of the map is past a predetermined time, a state in which the map is not the latest version, and the like. The above configuration corresponds to a configuration for executing a predetermined emergency action when the partial map data acquired by the map acquisition unit F4 has a defect that includes a missing part of the data. Note that steps S201 and S302 correspond to a map management step. At least one of steps S203, S205, S206, S208, and S306 corresponds to the control planning step. The emergency action can also be referred to as an urgent action in one aspect.

(Appendix (Part 2))

The control portion and the method therefor which have been described in the present disclosure may be also realized by a dedicated computer which constitutes a processor programmed to execute one or more functions concretized by computer programs. Also, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. The computer program may be stored, as instructions to be executed by a computer, in a tangible non-transitory computer-readable medium. Namely, the means and/or the functions which are provided by the automatic driving device 20 and the like may be provided by software stored in tangible memory devices and computers for executing them, only software, only hardware, or a combination thereof. Some or all of the functions of the automatic driving device 20 may be realized as hardware. A configuration in which a certain function is realized as hardware includes a configuration in which the function is realized by use of one or more ICs or the like. The processing unit 21 may be implemented by using an MPU, a GPU, or a data flow processor (DFP) instead of the CPU. The processing unit 21 may be implemented by combining multiple types of calculation processing devices such as a CPU, an MPU, and a GPU. The ECU may be implemented by using a field-programmable gate array (FPGA) or an application specific integrated circuit (ASIC). It should be noted that the various programs described above may be stored in a non-transitory tangible storage medium. Various storage media, such as a Hard-Disk Drive (HDD), a Solid State Drive (SSD), an Erasable Programmable ROM (EPROM), a flash memory, and a USB memory can be adopted as a storage medium of the program.

(Appendix (Part 3))

The present disclosure also includes the following configurations.

(Configuration 1)

An automatic driving device that generates a control plan using partial map data that is map data for a part of an entire area recorded in a map, the automatic driving device comprising;
 a map acquisition unit (F4) configured to acquire the partial map data corresponding to a position of a vehicle from a map server,
 a map management unit (F5) configured to determine an acquisition status of the partial map data; and
 a control planning unit (F7) configured to generate the control plan using the partial map data, wherein
 the map management unit determines whether next area map data that is the partial map data for an area which the vehicle is to enter has been acquired within a predetermined time, and
 the control planning unit plans execution of a predetermined emergency action in response to the map management unit determining that the next area map data has not been acquired.

(Configuration 2)

The automatic driving device according to the above configuration (1), wherein
 when the map management unit determines that the next area map data has not been acquired, the map management unit calculates a remaining time until the next area map data is required, and
 the control planning unit plans the execution of the predetermined emergency action in response to the remaining time until the next area map data is required becomes less than a predetermined threshold.

(Configuration 3)

The automatic driving device according to the above configuration (1), wherein
 the remaining time until the next area map data is required is time for the vehicle leaving an area corresponding to current area map data that is partial map data corresponding to a current position of the vehicle.

(Configuration 4)

The automatic driving device according to the above configuration (1), wherein
 the remaining time until the next area map data is required is time until the vehicle enters an area corresponding to the next area map data.

What is claimed is:

1. An automatic driving device that generates a control plan for autonomously driving a vehicle using map data, the automatic driving device comprising;
 a map management unit configured to determine an acquisition status of the map data; and
 a control planning unit configured to generate the control plan using the map data, wherein
 the control planning unit changes the control plan according to the acquisition status of the map data determined by the map management unit, wherein
 the control plan is generated using partial map data that is the map data for a part of an entire area recorded in a map, the automatic driving device further comprises a map acquisition unit configured to acquire the partial map data corresponding to a position of the vehicle from a map server, the map management unit determines whether the partial map data acquired by the map acquisition unit is defective, the control planning unit generates the control plan such that an inter-vehicle distance to a preceding vehicle is equal to or larger than a safe distance, when the map management unit determines that the partial map data is defective, the control planning unit temporarily sets, as an emergency action, a set value of the safe distance larger than a predetermined standard value, and the control planning unit executes the emergency action such that the vehicle is autonomously driven to maintain the inter-vehicle distance to the preceding vehicle according to the emergency action.

2. The automatic driving device according to claim 1, wherein the automatic driving device further comprises a map acquisition unit configured to acquire the partial map data corresponding to a position of the vehicle from a map server, and the map management unit determines whether next area map data that is the partial map data for an area which the vehicle is to enter has been acquired within a predetermined time, and the control planning unit plans execution of a predetermined emergency action in response to the map management unit determining that the next area map data has not been acquired.

3. The automatic driving device according to claim 2, wherein when the next area map data has not been acquired, the map management unit calculates a map acquisition remaining time determined according to a remaining time until the next area map data is required, and the control planning unit plans the execution of the predetermined emergency action when the map acquisition remaining time calculated by the map management unit becomes less than a predetermined threshold value.

4. The automatic driving device according to claim 3, wherein the control planning unit executes, as the emergency action, a process for notifying an occupant or an operator of predetermined information regarding the acquisition status of the partial map data when the map acquisition remaining time becomes less than a first time, and the control planning unit, as the emergency action, causes a travel speed of the vehicle to be reduced when the map acquisition remaining time becomes less than a second time shorter than the first time.

5. The automatic driving device according to claim 3, wherein the control planning unit calculates a degree of urgency according to the map acquisition remaining time, and changes a content of the emergency action according to the degree of urgency.

6. The automatic driving device according to claim 1, wherein the map management unit determines whether the map data is consistent with a real world based on sensing information provided by a periphery monitoring sensor mounted on the vehicle, and when determining that the map data is inconsistent with the real world, the map management unit determines that the map data includes partial map data that is defective.

7. The automatic driving device according to claim 6, wherein the map management unit determines that the map data is not consistent with the real world in at least one of cases where it is specified, based on the sensing information, that a forward vehicle traveling in front of the vehicle crosses a lane marking, and that a stationary object exists on a lane in which the forward vehicle was traveling, it is specified, based on the sensing information, that a plurality of preceding vehicles traveling in a same lane continuously cross the lane marking, or a traveling position of a surrounding vehicle traveling around the vehicle is outside a range of a road indicated by the map data.

8. The automatic driving device according to claim 2, wherein the emergency action includes at least one of notifying an occupant or an operator outside the vehicle that acquisition of the partial map data has failed, extending an inter-vehicle distance from a preceding vehicle, reducing a travel speed, requesting the occupant or the operator to take over a driving operation, starting deceleration for an emergency stop, requesting the partial map data from a surrounding vehicle using vehicle-to-vehicle communication, and continuing automatic driving without using the map data.

9. The automatic driving device according to claim 8, wherein when the emergency action derived from the acquisition status of the map data is executed, data indicating the acquisition status of the map data is output to a driving record device that records situations inside and outside the vehicle while the vehicle is traveling.

10. The automatic driving device according to claim 1, wherein the automatic driving device further comprises at least one processor, and the at least one processor is configured to execute processing as the map management unit and the control planning unit.

11. The automatic driving device according to claim 10, wherein the at least one processor is further configured to:

acquire the partial map data corresponding to a position of the vehicle from a map server via a wireless communication device mounted on the vehicle;

store the partial map data acquired from the map server in a map holding unit that is a predetermined storage area in which data is stored even when a driving power supply is turned off;

determine whether the partial map data for a next area that is an area which the vehicle is to enter within a predetermined time is stored in the map holding unit; and generate the control plan, when the partial map data for the next area is stored in the map holding unit, by using the partial map data stored in the map holding unit without newly receiving the partial map data for the next area from the map server.

12. The automatic driving device according to claim 11, wherein
the at least one processor is further configured to:
determine whether the partial map data is consistent with a real world based on sensing information provided from a periphery monitoring sensor mounted on the vehicle when the control plan is generated by using the partial map data that is stored in the map holding unit and was acquired during a previous traveling, and
download the partial map data corresponding to a current position from the map server when determining that the partial map data is inconsistent with the real world.

13. The automatic driving device according to claim 10, wherein
the at least one processor is further configured to:
download, from a map server via a wireless communication device mounted on the vehicle, the partial map data corresponding to a current position and the partial map data for a next area corresponding to an area which the vehicle is to enter within a predetermined time when a driving power supply is turned on, and
store the partial map data acquired from the map server in a map holding unit that is a predetermined storage area in which data is stored even when the driving power supply is turned off, and
when the partial map data for the next area is necessary for generating the control plan, in a case where (i) the partial map data for the next area has not been downloaded since the driving power supply was turned on, and (ii) the map holding unit stores the partial map data for the next area, the at least one processor generates the control plan using the partial map data stored in the map holding unit.

14. The automatic driving device according to claim 11, wherein
the at least one processor is further configured to:
change control conditions between a case where the control plan is generated using the partial map data acquired during previous travel and stored in the map holding unit and a case where the control plan is generated using the partial map data newly downloaded from the map server.

15. The automatic driving device according to claim 10, wherein
the at least one processor is further configured to:
determine whether the partial map data used in the control plan is consistent with a real world based on sensing information provided by a periphery monitoring sensor mounted on the vehicle, and
cause a display to display an image of a determination result indicating whether the partial map data is consistent with the real world.

16. The automatic driving device according to claim 10, wherein
the at least one processor is further configured to:
download the partial map data corresponding to a current position from a map server via a wireless communication device mounted on the vehicle when a driving power supply is turned on,
generate, in real time, an instant map that is a map showing a driving environment in front of the vehicle based on sensing information provided from a periphery monitoring sensor mounted on the vehicle when the at least one processor is incapable of downloading the partial map data corresponding to the current position, and
change contents of the control plan according to a mapping distance that is a distance in which the instant map has been generated.

17. The automatic driving device according to claim 10, wherein
the at least one processor is further configured to:
acquire, from a map server via a wireless communication device mounted on the vehicle, a capturing prohibited area that is an area in which capturing of an image by a camera is prohibited or a distribution prohibited area that is an area in which generation and distribution of a map is prohibited based on laws or ordinances,
determine whether the vehicle is approaching the capturing prohibited area or the distribution prohibited area based on position information of the capturing prohibited area or the distribution prohibited area acquired from the map server, and
request an occupant or an operator outside the vehicle to take over a driving operation when the vehicle is approaching the capturing prohibited area or the distribution prohibited area.

18. A vehicle control method for autonomously driving a vehicle using map data, the vehicle control method being executed by at least one processor, the vehicle control method comprising:
determining an acquisition status of the map data; and
generating a control plan for the vehicle using the map data, wherein
the generating of the control plan includes changing a content of the control plan according to the acquisition status of the map data, wherein
the control plan is generated using partial map data that is the map data for a part of an entire area recorded in a map, wherein
the vehicle control method further comprises:
acquiring the partial map data corresponding to a position of the vehicle from a map server;
determining whether the partial map data is defective;
generating the control plan such that an inter-vehicle distance to a preceding vehicle is equal to or larger than a safe distance;
when the partial map data is determined to be defective, setting, as an emergency action, a set value of the safe distance larger than a predetermined standard value; and
executing the emergency action such that the vehicle is autonomously driven to maintain the inter-vehicle distance to the preceding vehicle according to the emergency action.

19. An automatic driving device that generates a control plan for autonomously driving a vehicle using map data, the automatic driving device comprising;
a processor;
a non-transitory computer-readable storage medium; and
a set of computer-executable instructions stored on the non-transitory computer-readable storage medium that cause the processor to:
determine an acquisition status of the map data;
generate the control plan using the map data;
change the control plan according to the acquisition status of the map data that is determined, wherein
the control plan is generated using partial map data that is the map data for a part of an entire area recorded in a map, wherein
the set of computer-executable instructions further cause the processor to:

acquire the partial map data corresponding to a position of the vehicle from a map server;

determine whether the partial map data is defective;

generate the control plan such that an inter-vehicle distance to a preceding vehicle is equal to or larger than a safe distance;

when the partial map data is determined to be defective, temporarily setting, as an emergency action, a set value of the safe distance larger than a predetermined standard value; and executing the emergency action such that the vehicle is autonomously driven to maintain the inter-vehicle distance to the preceding vehicle according to the emergency action.

20. The automatic driving device according to claim 19, wherein the set of computer-executable instructions further cause the processor to:

determine whether the map data is consistent with a real world based on sensing information provided by a periphery monitoring sensor mounted on the vehicle; and when the map data is determined to be inconsistent with the real world, determine that the map data includes partial map data that is defective.

21. The automatic driving device according to claim 20, wherein the set of computer-executable instructions further cause the processor to determine that the map data is not consistent with the real world in at least one of cases where it is specified, based on the sensing information, that a forward vehicle traveling in front of the vehicle crosses a lane marking, and that a stationary object exists on a lane in which the forward vehicle was traveling, it is specified, based on the sensing information, that a plurality of preceding vehicles traveling in a same lane continuously cross the lane marking, or a traveling position of a surrounding vehicle traveling around the vehicle is outside a range of a road indicated by the map data.

* * * * *